US012675004B2

(12) United States Patent
Schianchi et al.

(10) Patent No.: US 12,675,004 B2
(45) Date of Patent: Jul. 7, 2026

(54) OPHTHALMIC ARTICLE IN PARTICULAR FOR SUNGLASSES

(71) Applicant: Essilor International, Charenton-le-pont (FR)

(72) Inventors: Natalia Schianchi, Parma (IT); Solange Ponot, Lyons (FR)

(73) Assignee: Essilor International, Charenton-le-pont (FR)

( * ) Notice: Subject to any disclaimer, the term of this patent is extended or adjusted under 35 U.S.C. 154(b) by 434 days.

(21) Appl. No.: 18/266,082

(22) PCT Filed: Dec. 9, 2021

(86) PCT No.: PCT/EP2021/085075
§ 371 (c)(1),
(2) Date: Jun. 8, 2023

(87) PCT Pub. No.: WO2022/122970
PCT Pub. Date: Jun. 16, 2022

(65) Prior Publication Data
US 2024/0036357 A1 Feb. 1, 2024

(30) Foreign Application Priority Data
Dec. 9, 2020 (EP) .................................... 20315487

(51) Int. Cl.
*G02C 7/10* (2006.01)
*G02B 5/23* (2006.01)

(52) U.S. Cl.
CPC ............... *G02C 7/102* (2013.01); *G02B 5/23* (2013.01)

(58) Field of Classification Search
CPC .................................. G02C 7/102; G02B 5/23
See application file for complete search history.

(56) References Cited

U.S. PATENT DOCUMENTS 7,506,977 B1 3/2009 Aiiso
2017/0261768 A1* 9/2017 Ambler .................. G02C 7/104
(Continued)

FOREIGN PATENT DOCUMENTS

CN 109791311 5/2019
EP 3351583 7/2018
(Continued)

OTHER PUBLICATIONS

Baillet et al, "How Transitions Lenses Filter Harmful Blue Light", Mar. 2016, Points De Vue, International Review of Ophthalmic Optics (Year: 2016).*
Baillet, G. et al., "How Transitions Lenses Filter Harmful Blue Light", *Points de Vue, International Review of Ophthalmic Optics,* 2016.
(Continued)

*Primary Examiner* — Bumsuk Won
*Assistant Examiner* — Ray Alexander Dean
(74) *Attorney, Agent, or Firm* — Norton Rose Fulbright US LLP

(57) ABSTRACT

The invention relates to an ophthalmic article (1), in particular for sunglasses, comprising at least one substrate (9) and a photochromic filter compound (15), the ophthalmic article (1) having a first transmission spectrum in an activated state of the photochromic filter compound (15) and a second transmission spectrum in a deactivated state of the photochromic filter compound, such that: •—the first and the second transmission spectra at wavelengths lower than 380 nm is lower than 1%, •—the first and the second transmission spectra have a relative first maximum between 460 nm and 510 nm, •—the first and the second transmission spectrum have a relative first minimum between 560 nm and 610 nm, and where •—$T_v^{activated}$ is the luminous transmittance according to ISO_13666 in the activated state of the photochromic filter compound. •—$T_v^{deactivated}$ is the luminous transmittance according to ISO_13666 in the deactivated
(Continued)

Figures 1, 2:
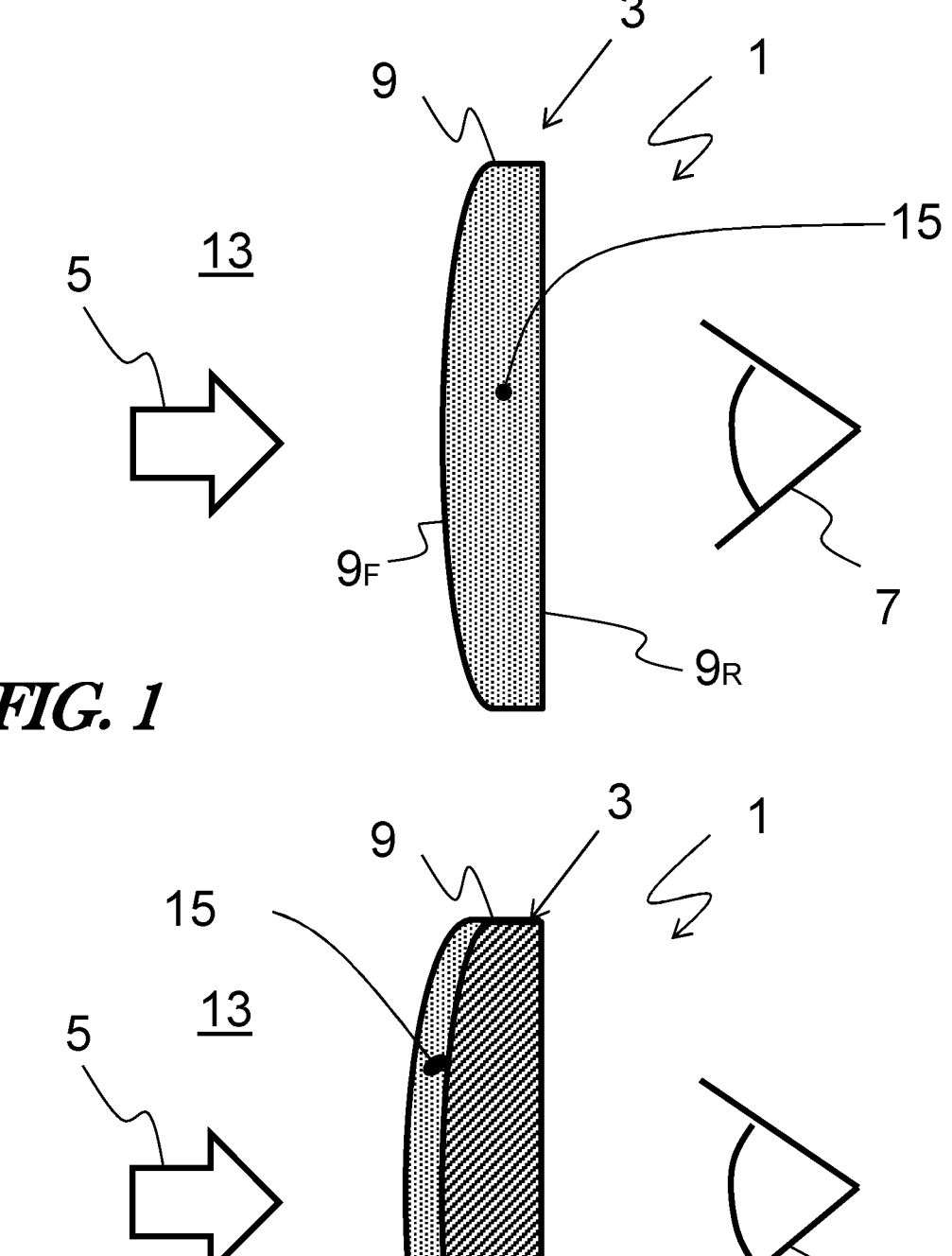

state of the photochromic filter compound. •The lens has a reduced transmission in the blue between 400 and 450 nm and a reduced transmission around 585 nm. The lens provides a good contrast and reduces glare.

$$\frac{T_v^{deactivated}}{T_v^{activated}} > 2.5$$

$$T_v^{activated}$$

$$T_v^{deactivated}$$

19 Claims, 4 Drawing Sheets

(56) References Cited

U.S. PATENT DOCUMENTS

| | | | |
|---|---|---|---|
| 2018/0340044 A1 | 11/2018 | Kakinuma et al. | |
| 2019/0153146 A1 | 5/2019 | Kakinuma et al. | |
| 2019/0211258 A1* | 7/2019 | Kawato | G02B 1/041 |
| 2020/0285078 A1 | 9/2020 | Martins | |

FOREIGN PATENT DOCUMENTS

| | | |
|---|---|---|
| EP | 3351593 | 7/2018 |
| EP | 3521907 | 8/2019 |

OTHER PUBLICATIONS

International Search Report issued in corresponding PCT Application No. PCT/EP2021/085075, mailed Apr. 26, 2022.
Office Action issued in corresponding Chinese Application No. 202180081724.1, dated Mar. 20, 2026 (English Translation provided).

* cited by examiner

OPHTHALMIC ARTICLE IN PARTICULAR FOR SUNGLASSES

CROSS-REFERENCE TO RELATED APPLICATIONS

This application is a national phase application under 35 U.S.C. § 371 of International Application No. PCT/EP2021/085075 filed 9 Dec. 2021, which claims priority to European Patent Application No. 20315487.7 filed 9 Dec. 2020. The entire contents of each of the above-referenced disclosures is specifically incorporated by reference herein without disclaimer.

The present invention relates to an ophthalmic article, in particular for sunglasses.

The term "ophthalmic article" is specifically understood to mean a lens, corrective or otherwise, that can be used as spectacle glass, for spectacles for example, particularly sunglasses, goggles, visors or the like.

Wearing sunglasses, in particular when it is very bright outside, is medically recommended to preserve one's long-term vision potential and also for safety reasons, for example when driving.

The discussion of the background of the invention herein is included to explain the context of the invention. This is not to be taken as an admission that any of the material referred to was published, known or part of the common general knowledge at the priority date of any of the claims.

Specifically, sunglasses form a barrier to UV (ultraviolet) rays. Many studies have shown that UV rays may engender lesions, inflammations or degradation of the cornea, of the crystalline lens or of the retina. In order to avoid these effects and above all a modification of the eye that could decrease vision long-term, people are increasingly encouraged to wear sunglasses in order to avoid exposure to too high a light intensity.

In addition, sunglasses also allow discomfort glare to be combatted, thereby increasing safety when driving or during sporting activities, for example skiing or other potentially risky activities.

For this reason, sunglasses sold at the present time block all radiation of wavelength lower than 400 nm.

However, in the last few years medical studies have demonstrated that a wavelength range of about 430 nm (+/−20 nm), also known as the bad blue, plays an important role for example in age-related macular degeneration (AMD) or age-related maculopathy (ARM). It is a question of a process that is cumulative over a person's lifetime and that becomes problematic in particular for people older than 60 years old.

To remedy these problems, ophthalmic lenses with filters that are more pronounced in the visible blue portion of the spectrum between 400 nm and 480 nm are known.

However, these known ophthalmic lenses are not entirely satisfactory in so far as a portion of the "good blue" between 450 nm and 480 nm is also substantially attenuated, this degrading the visual spectral perception of the wearer of the sunglasses. In addition, a degradation in the contrast perceived by the user is observed, this possibly having a negative impact on safety, in particular when driving.

This lack of contrast may lead to the wearer of the sunglasses experiencing substantial visual fatigue and may also result in queasiness, or even cause headaches in extreme cases. This decrease in contrast may also lead to difficulties in appreciating perspective in the field of view. For a driver of a vehicle, it is possible that the traffic situation in front of the vehicle will be poorly read, this possibly representing a certain danger to the driver himself and to any other people present.

Furthermore, light is mostly beneficial for visual and non-visual functions of the eye, including not only visual perception, but also circadian functions.

Indeed, during the past 2 decades, empirical proof has evidenced that human physiology and behavior are largely influenced by retinal illumination.

Therefore, the attenuation of visible beneficial light induced by sunglasses may progressively have a detrimental effect on the biological, hormonal and behavioral functions entrained by retinal illumination. A daily repeated and abusively prolonged wearing of sunglasses interferes with the circadian rhythm of the wearer. In long-term, that might induce, for example, sleep troubles, seasonal affective disorders, mood disorders.

Furthermore, by significantly attenuating light intensity, sunglasses increase pupil area with a logarithmic trend. The increase in pupil size which normally accompanies decrease of illumination should enhance to some extent the deleterious effects on visual acuity of the optical aberrations.

Moreover, the increase in pupil size increases the energetic power of non-filtered wavelengths reaching the retina, particularly the noxious blue-violet wavelengths.

Accordingly, the present invention aims at overcoming at least one technical problem of the prior art as mentioned above.

In particular, one aim of the invention is to provide an ophthalmic article that optimizes the incident light intensity when being exposed or not to sunlight and which enhances the protection against harmful light while preserving the beneficial effects of visible daylight.

The objective of the invention is therefore to provide an improved ophthalmic article allowing the drawbacks of the prior art to be at least partially solved.

With this aim, the invention proposes an ophthalmic article, in particular for sunglasses, comprising at least one substrate and a photochromic filter compound, the ophthalmic article having a first transmission spectrum in an activated state of the photochromic filter compound and a second transmission spectrum in a deactivated state of the photochromic filter compound, such that:

the first and the second transmission spectra at wavelengths lower than 380 nm is lower than 1%, in particular 0.03%, the first and the second transmission spectra have a relative first maximum between 460 nm and 510 nm, the first and the second transmission spectrum have a relative first minimum between 560 nm and 610 nm, and $$\frac{T_v^{deactivated}}{T_v^{activated}} > 2.5$$

where $$T_v^{activated}$$

is the luminous transmittance according to ISO_13666 in the activated state of the photochromic filter compound, $$T_v^{deactivated}$$

is the luminous transmittance according to ISO_13666 in the deactivated state of the photochromic filter compound.

Such an ophthalmic article is suited to be worn outside as well as inside buildings. It assures transmission of "good blue" wavelength that influences the circadian rhythm of the wearer in a positive way, in particular outside when exposed to sunlight. Contrast is also enhanced contributing to a good perception and an increased visual acuity. In long-term, sleep troubles, seasonal affective disorders and mood disorders may be prevented and heath of the wearer is at least stabilized or even improved.

The general concept behind the invention can be considered to combine in one ophthalmic article photochromic features which may be in an activated or a deactivated state, with specific light filtering properties to get a well-adapted transmission spectrum that does not disturb circadian rhythm.

The ophthalmic article may present one or several of the following aspects taken alone or in combination.

According to one aspect:

$$3.1 > \frac{T_v^{deactivated}}{T_v^{activated}} > 2.6.$$

According to another aspect, the luminous transmittance $$T_v^{activated}$$

according to ISO 13666 is lower than 30%, in particular lower than 25%, in the activated state of the photochromic filter compound and the luminous transmittance $$T_v^{deactivated}$$

according to ISO_13666 is higher than 65%, in particular higher than 75%, in the deactivated state of the photochromic filter compound.

In the activated state of the photochromic filter compound, the transmission of the first spectrum may be less than 30%, in particular less than 25%, between 425 nm and 450 nm.

In the activated state of the photochromic filter compound, the transmission of the first spectrum shows for example a variation of less than 2%, in particular less than 1%, between 430 nm and 450 nm.

Said first maxima of the first and the second spectra can be distant less than 5 nm from each other, in particular at the same wavelength, and said first minima of the first and the second spectrum and can be distant less than 5 nm from each other, in particular at the same wavelength.

According to a possible further aspect $$\frac{T_{MAX1}^{deactivated}}{T_{MAX1}^{activated}} > 1.5$$

where $$T_{MAX1}^{activated}$$

is the transmittance at the wavelength of the first maximum in the activated state of the photochromic filter compound, $$T_{MAX1}^{deactivated}$$

is the transmittance at the wavelength of the first maximum in the deactivated state of the photochromic filter compound.

Moreover another possible aspect, $$\frac{T_{MIN1}^{deactivated}}{T_{MIN1}^{activated}} > 3,5$$

where $$T_{MIN1}^{activated}$$

is the transmittance at the wavelength of the first minimum in the activated state of the photochromic filter compound, $$T_{MIN1}^{deactivated}$$

is the transmittance at the wavelength of the first minimum in the state of the photochromic filter compound.

The transmission between 435 nm and 530 nm is for example equal or higher than 70%, in particular equal or higher than 75%, for the second transmission spectrum in the deactivated state of the photochromic filter compound.

The first relative minimum may have a transmission of 35%, in particular 30%, or less for the second transmission spectrum in the deactivated state of the photochromic filter compound.

The transmission at a wavelength equal or superior to 610 nm can be equal or higher than 75%, in particular equal or higher than 80%, for the second transmission spectrum in the deactivated state of the photochromic filter compound.

The second transmission spectrum in the deactivated state of the photochromic filter compound presents for example a second relative minimum at 536 nm+/−3 nm with a transmission comprised between 65% and 80%, in particular between 70% and 75%.

The second transmission spectrum in the deactivated state of the photochromic filter compound may present a second relative maximum at 547 nm+/−3 nm with a transmission comprised between 70% and 85%, in particular between 75% and 80%. The first relative maximum of the first transmission spectrum in the activated state of the photochromic filter compound can present a transmission comprised between 40% and 55%.

The ophthalmic article may comprise furthermore a film deposited on the substrate and which comprises the photochromic filter compound.

According to another example, the photochromic filter compound may be integrated in the matrix of the substrate.

The photochromic filter compound comprises in particular a mix of solvent dyes, narrow band dyes and photochromic dyes.

The at least one substrate comprises for example one or more colorants and/or pigments, said colorants and/or pigments of all the substrates interacting together with the photochromic filter compound in order to absorb the light passing through the ophthalmic article for providing the first transmission spectrum in the activated state of the photochromic filter compound and the second transmission spectrum in the deactivated state of the photochromic filter compound.

The first relative minimum has for example a transmission of 10% or less for the first transmission spectrum in the activated state of the photochromic filter compound.

The invention also relates to sunglasses comprising an ophthalmic article as described above.

Figure 3:
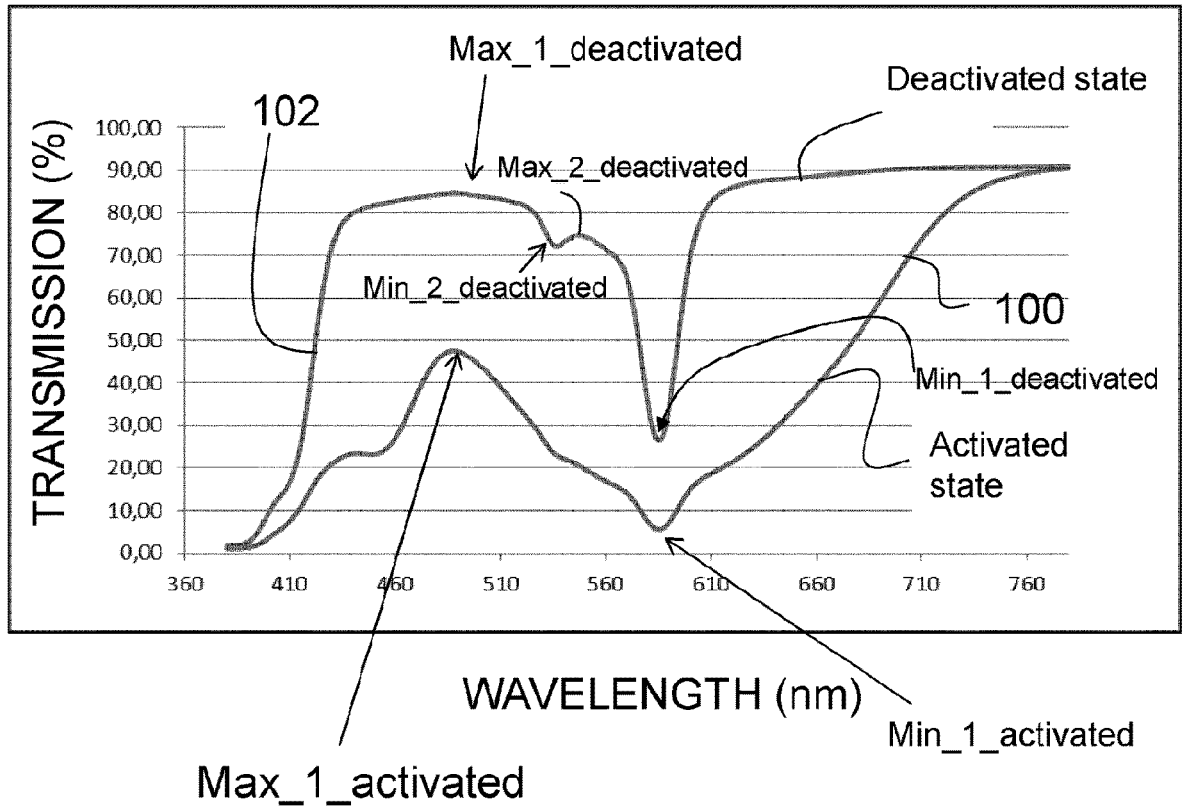
Figure 4:
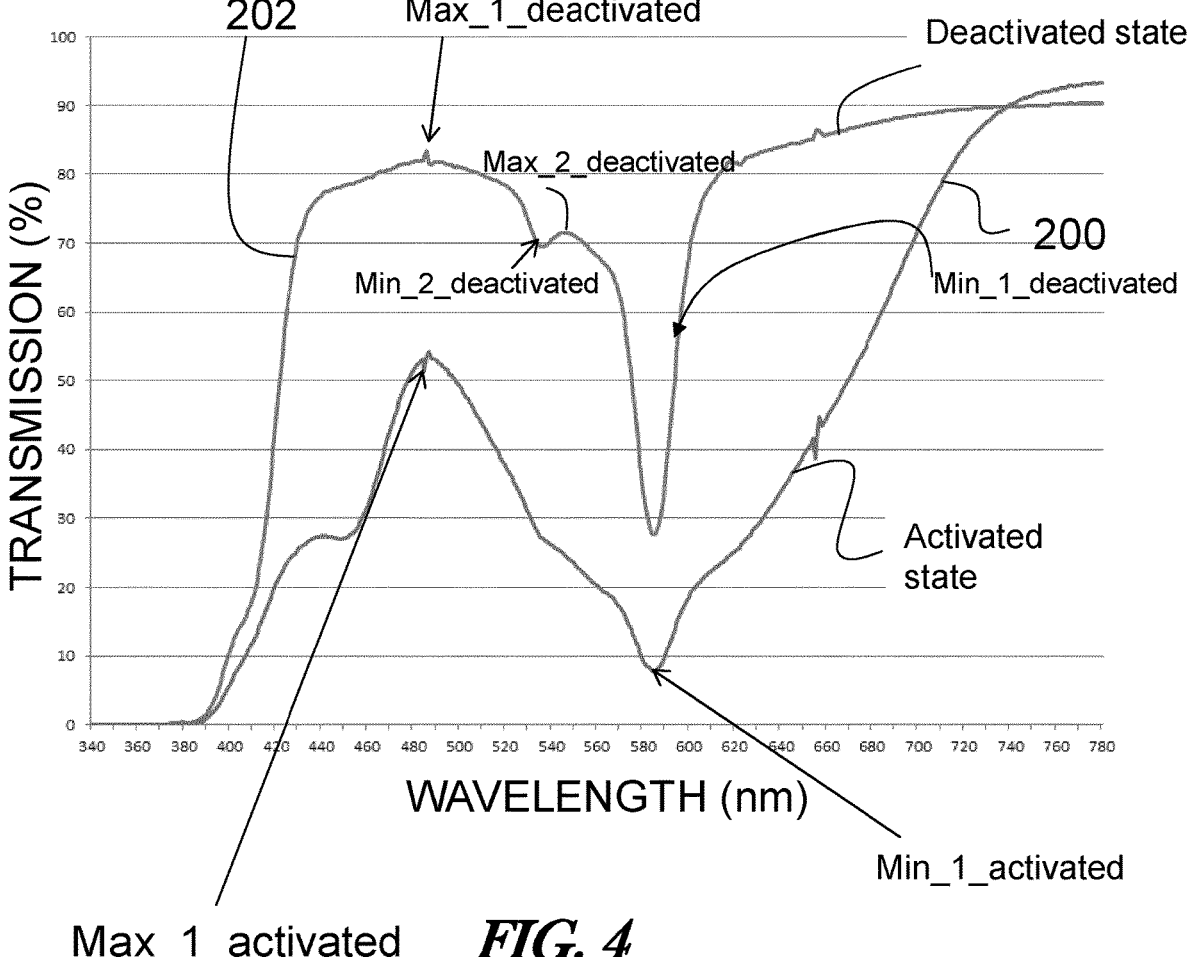
Figure 5:
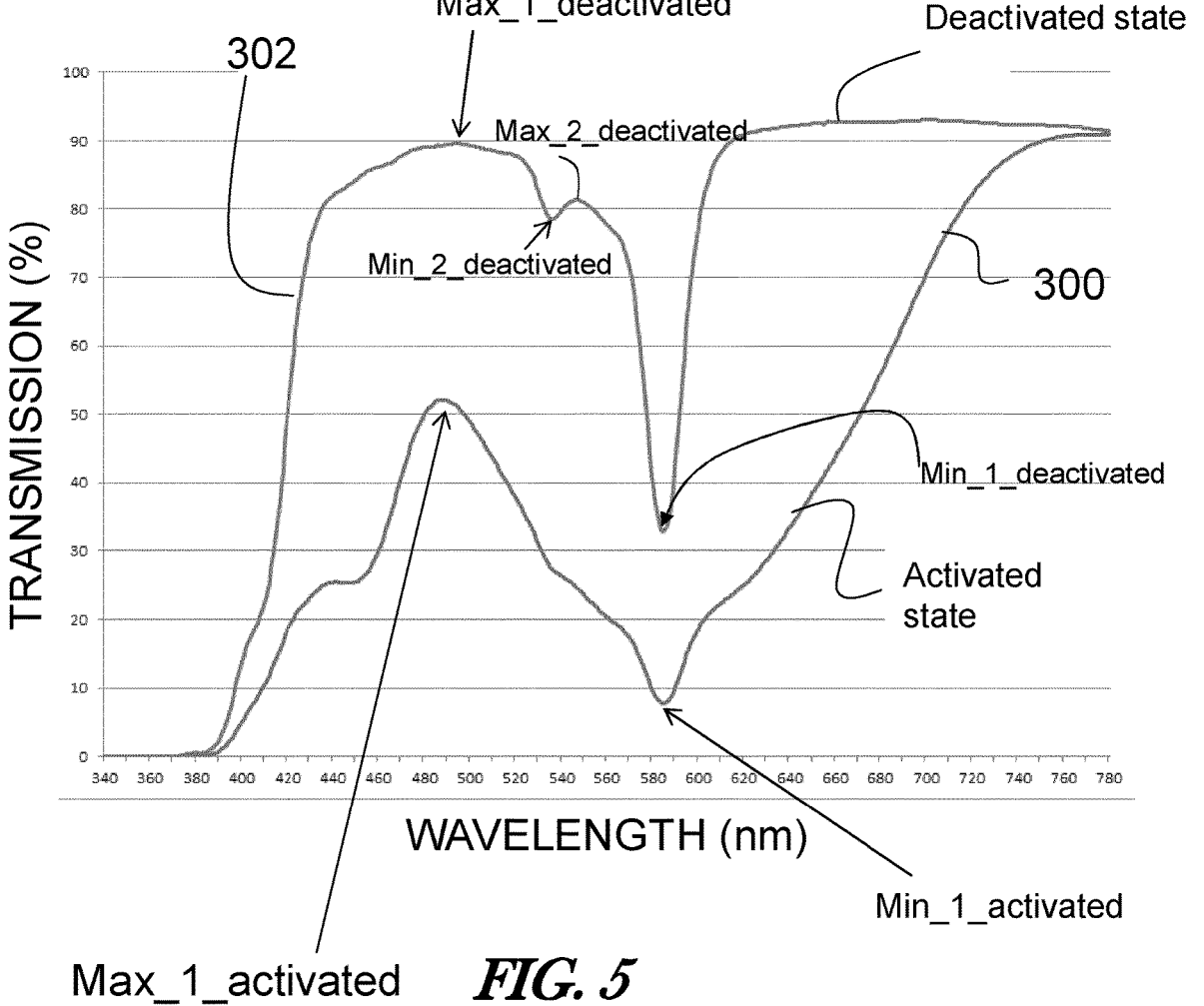

Other advantages and features will become apparent upon reading the description of the following figures, among which:

FIG. 1 is a schematic cross-sectional view of an example of an embodiment of an ophthalmic article according to the invention, FIG. 2 is a schematic cross-sectional view of another example of an embodiment of an ophthalmic article according to the invention, FIG. 3 shows a first example of transmission spectra of the ophthalmic article in FIG. 1 or 2 in an activated and a deactivated state, FIG. 4 shows a second example of transmission spectra of the ophthalmic article in FIG. 1 or 2 in an activated and a deactivated state, and FIG. 5 shows a third example of transmission spectra of the ophthalmic article in FIG. 1 or 2 in an activated and a deactivated state.

On all the figures, the same elements bear the same reference numbers.

The following embodiments are only examples. Although the description refers to one or several embodiments, the invention is not limited to theses embodiments. In addition, a feature described in relationship with one embodiment may also concern another embodiment even if this is not mentioned expressively. Simple features of different embodiments may also be combined to provide further realizations.

In the present description, by "front" or "back" face of a layer, reference is made to the propagation of the rays of light towards the eye through the ophthalmic lens when an ophthalmic device bearing the ophthalmic lens is worn on a wearer's face. Thus a "front" face is always that which is closest directed toward the user's field of view and a "rear" face is always that which is closest to the eye of the user.

By "upstream" or "downstream" of two elements or layers, one refers to the propagation of the rays of light towards the eye in the same system as presented above. Thus, a first element is disposed upstream of a second element when the light passes through its path towards the eye of the user first through the first element and then through the second element. Conversely, a first element is disposed "downstream" of a second element when the light passes through its path towards the eye of the user first through the second element and then through the first element.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%.

The ophthalmic article 1 as shown in the FIGS. 1 and 2 is for example intended to be used for spectacles, in particular sunglasses. To do this, it is only necessary to shape the outer edge 3 according to the desired shape of the frame of the eyeglasses or sunglasses. Alternatively, and within the scope of the disclosure, the ophthalmic article may be intended for goggles, vision visors or the like.

In FIGS. 1 and 2 is shown two examples of an ophthalmic article 1. The light incident on the ophthalmic article 1 is shown by the arrow 5 and an eye 7 represents a user. The field of view 13 is thus situated on the side of the arrow 5 and the user looks through the ophthalmic article 1 with his eye 7.

By ophthalmic article 1 is meant a corrective lens or not (piano-lens), finished or semi-finished, suitable for being mounted in a frame, for example a spectacle frame, goggles, a mask or a visor intended to be placed in front of the eyes and forming a screen of visual protection.

The ophthalmic article 1 comprises at least one layer or substrate 9 (see for example FIG. 1).

According to a non-shown embodiment, the substrate 9 may be composed of several layers fixed together. One of these layers, in particular the one closest to the eye may be crystal and present on the rear side a curvature for optical correction of the users view.

The ophthalmic article 1 comprises also a photochromic filter compound 15.

As to the example in FIG. 1, the photochromic filter compound 15 is integrated in the matrix of the substrate 9.

As to the example in FIG. 2, a film 17 which comprises a photochromic filter compound 15, is deposited on the substrate 9.

With regard to both examples of FIGS. 1 and 2, the substrate 9 may comprise furthermore one or more colorants and/or pigments, said colorants and/or pigments of all the substrates interacting together with the photochromic filter compound 15 in order to absorb the light passing through the ophthalmic article 1.

In particular the photochromic filter compound 15 in conjunction or not with further colorants and/or pigments is configured for providing a first transmission spectrum in the activated state of the photochromic filter compound 15, for example when sufficient intensity of UV-light impinges the ophthalmic article 1, and a second transmission spectrum in a deactivated state of the photochromic filter compound 15, for example when the light impinging the ophthalmic article 1 does not comprise sufficient intensity of UV-light for activation of the photochromic filter compound 15.

The photochromic filter compound 15 comprises in particular a mix of solvent dyes like for example Anthraquinone dye, Azo dye, Pyrazolone dye, narrow band dyes like for example Porphyrazines, or tetraazaporphyrins, and photochromic dyes like for example naphthopyrans, or indeno-fused naphthopyrans.

In this context, treatments conferring additional functions, either alone or in combination among the following non-exhaustive list: shockproof, anti-scratch, anti-abrasion, anti-fouling, anti-fogging, anti-static may be deposited on the substrate 9 (front face 9F or rear face 9R) or the film 17 without negligible influence of the transmission spectra of the ophthalmic article 1.

The substrate 9 is for example made of a plastic material, thermoset, in particular made of poly(urea-urethane), or thermoplastic plastic material, in particular made of polyamide (PA), like nylon or a polycarbonate, or polyester.

The substrate 9 has a rear face 9R to be oriented toward the eye 7 of the user and a front face 9F to be oriented toward the field of vision 13 of the user. The substrate 9 has a for example a thickness comprised between 0.5 mm and 5 mm, preferentially comprised between 1 mm and 4 mm, most preferably between 1.4 mm and 4 mm or even between 1.5 mm and 3 mm.

However, other thicknesses for substrate 9 can be chosen in function for example of the optical correction of the ophthalmic article 1. In particular, if an optical correction is desired, substrate 9 may have a non-uniform thickness, so that its front face 9F has a different curvature than its rear face 9R.

In this embodiment the ophthalmic article is in particular a plano lens, i.e. a lens considered without optical power. In another embodiment, the rear face 9R of the substrate 9A may be surface finished for a corrective effect.

Turning to FIG. 3 showing a first example of transmission spectra of the ophthalmic article in FIG. 1 or 2.

The ophthalmic article 1 presents a first transmission spectrum 100 in an activated state of the photochromic filter compound 15 and a second transmission spectrum 102 in a deactivated state of the photochromic filter compound 15, such that:

the first 100 and the second 102 transmission spectrum at wavelengths lower than 380 nm is lower than 1%, in particular 0.03%, the first 100 and the second 102 transmission spectrum have a respective relative first maximum, Max_1_deactivated and Max_1_activated, between 460 nm and 510 nm, the first 100 and the second 102 transmission spectrum have a respective relative first minimum Min_1_deactivated and Min_1_activated, between 560 nm and 610 nm, and $$\frac{T_v^{deactivated}}{T_v^{activated}} > 2.5$$

where $$T_v^{activated}$$

is the luminous transmittance according to ISO_13666 in the activated state of the photochromic filter compound, $$T_v^{deactivated}$$

is the luminous transmittance according to ISO_13666 in the deactivated state of the photochromic filter compound.

For reminder, the luminous transmittance in ISO standard 13666 is defined as:

8

$$\tau_v = 100 \times \frac{\int_{380\,nm}^{780\,nm} \tau(\lambda) \cdot V(\lambda) \cdot SD65\lambda(\lambda) \cdot d\lambda}{\int_{380\,nm}^{780\,nm} V(\lambda) \cdot SD65\lambda(\lambda) \cdot d\lambda} \%$$

where $\tau(\lambda)$ is the spectral transmittance of the tinted spectacle lens;

$V(\lambda)$ is the spectral luminous of function for daylight (see ISO/CIE 10527)

$S_{D65\lambda}(\lambda)$ the spectral distribution of radiation of CIE standard illuminant D 65 (see ISO/CIE 10526).

In particular $$3.1 > \frac{T_v^{deactivated}}{T_v^{activated}} > 2.6.$$

As can be seen in FIG. 3, the luminous transmittance $$T_v^{activated}$$

according to ISO_13666 is lower than 25% in the activated state of the photochromic filter compound 15 and the luminous transmittance $$T_v^{deactivated}$$

according to ISO_13666 is higher than 65% in the deactivated state of the photochromic filter compound 15.

In the activated state of the photochromic filter compound 15, the transmission of the first spectrum 100 is less than 30%, in particular less than 25%, between 425 nm and 450 nm.

Between 430 nm and 450 nm, in the activated state of the photochromic filter compound 15, the transmission is nearly constant with a transmission value comprises between 20% and 25%, in particular between 20.0% and 22.5%. This part of the spectrum 100 in the activated state of the photochromic filter compound contributes the improvement of circadian perception of the user.

As can be seen in FIG. 3, said first maxima, Max_1_deactivated and Max_1_activated of respective first 100 and the second 102 spectrum are distant less than 5 nm from each other and said first minima, Min_1_deactivated and Min_1_activated, of respective first 100 and the second 102 spectrum and are distant less than 5 nm from each other, in the present example they are at the same wavelength.

In this case:

(Max_1_deactivated)=486 nm (Max_1_activated)=486 nm (Min_1_deactivated)=585 nm (Min_1_activated)=585 nm The relationship of the transmission in the activated and deactivated state at the maxima is $$\frac{T_{MAX1}^{deactivated}}{T_{MAX1}^{activated}} > 1.5$$

9
10 where $$T_{MAX1}^{activated}$$

is the transmittance at the wavelength of the first maximum Max_1_activated in the activated state of the photochromic filter compound 15, $$T_{MAX1}^{deactivated}$$

is the transmittance at the wavelength of the first maximum Max_1_deactivated in the deactivated state of the photochromic filter compound 15.

The relationship of the transmission in the activated and deactivated state at the minima is $$\frac{T_{MIN1}^{deactivated}}{T_{MIN1}^{activated}} > 5$$

where $$T_{MIN1}^{activated}$$

is the transmittance at the wavelength of the first minimum Min_1_activated in the activated state of the photochromic filter compound 15, $$T_{MIN1}^{deactivated}$$

is the transmittance at the wavelength of the first minimum Min_1_deactivated in the deactivated state of the photochromic filter compound 15.

In particular, the transmission between 435 nm and 530 nm is equal or higher than 70% for the second transmission spectrum 102 in the deactivated state of the photochromic filter compound 15.

The first relative minimum Min_1_deactivated has a transmission of 30% or less for the second transmission spectrum 102 in the deactivated state of the photochromic filter compound 15.

The transmission at a wavelength equal or superior to 610 nm is equal or higher than 80% for the second transmission spectrum 102 in the deactivated state of the photochromic filter compound 15.

In addition, the second transmission spectrum 102 in the deactivated state of the photochromic filter compound presents a second relative minimum Min_2_deactivated at 536 nm+/−3 nm with a transmission comprised between 70% and 75%.

The second transmission spectrum 102 in the deactivated state of the photochromic filter compound 15 presents a second relative maximum Max_2_deactivated at 547 nm+/−3 nm with a transmission comprised between 75% and 80%.

The first relative maximum Max_1_activated of the first transmission spectrum 100 in the activated state of the photochromic filter compound 15 presents a transmission comprised between 40% and 50%.

The first relative minimum MIN_1_activated has a transmission of 10% or less for the first transmission spectrum 100 in the activated state of the photochromic filter compound 15.

The following table shows the measured transmission value in percentage according to the example of FIG. 3.

| Wavelength (nm) | Transmission (%) in activated state of the photochromic compound | Transmission (%) in deactivated state of the photochromic compound |
|---|---|---|
| 780 | 93.2466 | 94.9735 |
| 779 | 93.1403 | 94.9004 |
| 778 | 93.008 | 94.7934 |
| 777 | 92.8818 | 94.6911 |
| 776 | 92.8994 | 94.7519 |
| 775 | 92.9903 | 94.8859 |
| 774 | 92.9881 | 94.9165 |
| 773 | 92.8922 | 94.8385 |
| 772 | 92.7194 | 94.6966 |
| 771 | 92.6045 | 94.6295 |
| 770 | 92.6777 | 94.7556 |
| 769 | 92.6734 | 94.7991 |
| 768 | 92.65 | 94.8351 |
| 767 | 92.6299 | 94.9062 |
| 766 | 92.4974 | 94.7957 |
| 765 | 92.269 | 94.6046 |
| 764 | 92.3235 | 94.7458 |
| 763 | 92.4923 | 95.021 |
| 762 | 92.5562 | 95.1687 |
| 761 | 92.2954 | 94.9428 |
| 760 | 92.044 | 94.794 |
| 759 | 92.0582 | 94.9059 |
| 758 | 91.9775 | 94.9291 |
| 757 | 91.9054 | 94.9571 |
| 756 | 91.9581 | 95.1422 |
| 755 | 91.9062 | 95.2126 |
| 754 | 91.7392 | 95.1789 |
| 753 | 91.5793 | 95.1287 |
| 752 | 91.4232 | 95.1099 |
| 751 | 91.2686 | 95.1224 |
| 750 | 91.1312 | 95.1225 |
| 749 | 91.1043 | 95.2747 |
| 748 | 91.0527 | 95.3999 |
| 747 | 90.865 | 95.3799 |
| 746 | 90.6472 | 95.3656 |
| 745 | 90.3893 | 95.2972 |
| 744 | 90.141 | 95.2542 |
| 743 | 89.8557 | 95.1715 |
| 742 | 89.6243 | 95.1715 |
| 741 | 89.4816 | 95.2671 |
| 740 | 89.1957 | 95.2236 |
| 739 | 88.9002 | 95.1758 |
| 738 | 88.7242 | 95.2738 |
| 737 | 88.389 | 95.2056 |
| 736 | 88.0561 | 95.1714 |
| 735 | 87.7038 | 95.1049 |
| 734 | 87.2254 | 94.924 |
| 733 | 86.8556 | 94.8724 |
| 732 | 86.4444 | 94.8044 |
| 731 | 85.9647 | 94.6586 |
| 730 | 85.5551 | 94.6151 |
| 729 | 85.1096 | 94.5394 |
| 728 | 84.6807 | 94.5249 |
| 727 | 84.2491 | 94.494 |
| 726 | 83.7465 | 94.4023 |
| 725 | 83.2788 | 94.3705 |
| 724 | 82.7864 | 94.3416 |
| 723 | 82.3172 | 94.3343 |
| 722 | 81.7895 | 94.3036 |
| 721 | 81.2493 | 94.2502 |
| 720 | 80.6974 | 94.2181 |
| 719 | 80.1192 | 94.1557 |
| 718 | 79.5229 | 94.1009 |
| 717 | 78.9727 | 94.1273 |

-continued

-continued

| Wavelength (nm) | Transmission (%) in activated state of the photochromic compound | Transmission (%) in deactivated state of the photochromic compound | | Wavelength (nm) | Transmission (%) in activated state of the photochromic compound | Transmission (%) in deactivated state of the photochromic compound |
|---|---|---|---|---|---|---|
| 716 | 78.3634 | 94.0794 | | 643 | 28.4937 | 89.1105 |
| 715 | 77.7233 | 94.0271 | | 642 | 27.9762 | 88.8475 |
| 714 | 77.0486 | 93.9472 | | 641 | 27.4383 | 88.7089 |
| 713 | 76.3988 | 93.9279 | 10 | 640 | 27.0127 | 88.649 |
| 712 | 75.7626 | 93.9484 | | 639 | 26.5192 | 88.4977 |
| 711 | 75.0524 | 93.8873 | | 638 | 26.0403 | 88.4314 |
| 710 | 74.3504 | 93.8457 | | 637 | 25.6361 | 88.5638 |
| 709 | 73.6753 | 93.856 | | 636 | 25.2092 | 88.6164 |
| 708 | 72.9463 | 93.8195 | | 635 | 24.8272 | 88.7974 |
| 707 | 72.1293 | 93.6558 | 15 | 634 | 24.398 | 88.7406 |
| 706 | 71.3946 | 93.6785 | | 633 | 23.9766 | 88.6784 |
| 705 | 70.6644 | 93.6886 | | 632 | 23.585 | 88.6953 |
| 704 | 69.8724 | 93.6118 | | 631 | 23.1486 | 88.4498 |
| 703 | 69.082 | 93.5403 | | 630 | 22.7018 | 88.0896 |
| 702 | 68.2673 | 93.4953 | | 629 | 22.2769 | 87.8246 |
| 701 | 67.4645 | 93.4487 | 20 | 628 | 21.9772 | 88.0072 |
| 700 | 66.6468 | 93.3981 | | 627 | 21.6172 | 87.8742 |
| 699 | 65.84 | 93.3552 | | 626 | 21.3703 | 88.1078 |
| 698 | 64.9877 | 93.273 | | 625 | 21.1543 | 88.4378 |
| 697 | 64.1214 | 93.135 | | 624 | 20.8896 | 88.5678 |
| 696 | 63.3253 | 93.1643 | | 623 | 20.5703 | 88.3182 |
| 695 | 62.5181 | 93.1414 | 25 | 622 | 20.2383 | 88.0371 |
| 694 | 61.7028 | 93.1176 | | 621 | 19.9999 | 88.1304 |
| 693 | 60.8724 | 93.0549 | | 620 | 19.6559 | 87.5511 |
| 692 | 60.0542 | 93.0283 | | 619 | 19.3635 | 87.2865 |
| 691 | 59.1996 | 92.9267 | | 618 | 19.1092 | 87.1082 |
| 690 | 58.3925 | 92.9099 | | 617 | 18.8289 | 86.7269 |
| 689 | 57.5445 | 92.7871 | | 616 | 18.5915 | 86.5417 |
| 688 | 56.7037 | 92.6952 | 30 | 615 | 18.3289 | 86.1272 |
| 687 | 55.8807 | 92.5879 | | 614 | 18.0986 | 85.8249 |
| 686 | 55.052 | 92.4845 | | 613 | 17.8573 | 85.3876 |
| 685 | 54.2314 | 92.3565 | | 612 | 17.6196 | 84.9584 |
| 684 | 53.4501 | 92.3166 | | 611 | 17.3939 | 84.5833 |
| 683 | 52.7201 | 92.3265 | | 610 | 17.1529 | 83.8823 |
| 682 | 51.9905 | 92.3351 | 35 | 609 | 16.9178 | 83.3646 |
| 681 | 51.238 | 92.2844 | | 608 | 16.6722 | 82.6749 |
| 680 | 50.4891 | 92.2081 | | 607 | 16.4134 | 81.8548 |
| 679 | 49.7301 | 92.0884 | | 606 | 16.1716 | 81.0922 |
| 678 | 48.9859 | 91.9785 | | 605 | 15.8337 | 79.8371 |
| 677 | 48.3012 | 91.9875 | | 604 | 15.5735 | 78.9348 |
| 676 | 47.6082 | 91.9693 | 40 | 603 | 15.2187 | 77.4774 |
| 675 | 46.9825 | 91.9943 | | 602 | 14.8704 | 75.9489 |
| 674 | 46.3253 | 91.9716 | | 601 | 14.479 | 74.2559 |
| 673 | 45.6715 | 91.9928 | | 600 | 14.0056 | 72.1113 |
| 672 | 44.9745 | 91.7996 | | 599 | 13.5228 | 69.8303 |
| 671 | 44.3194 | 91.7485 | | 598 | 12.9358 | 67.019 |
| 670 | 43.7441 | 91.7681 | 45 | 597 | 12.3261 | 64.0261 |
| 669 | 43.0945 | 91.7704 | | 596 | 11.6668 | 60.7499 |
| 668 | 42.5018 | 91.7613 | | 595 | 10.9341 | 57.0751 |
| 667 | 41.8893 | 91.694 | | 594 | 10.1699 | 53.1498 |
| 666 | 41.2862 | 91.6367 | | 593 | 9.39978 | 49.2135 |
| 665 | 40.667 | 91.5239 | | 592 | 8.59399 | 44.9691 |
| 664 | 40.0895 | 91.4821 | 50 | 591 | 7.84657 | 41.074 |
| 663 | 39.523 | 91.4618 | | 590 | 7.16325 | 37.4711 |
| 662 | 38.9318 | 91.3733 | | 589 | 6.5773 | 34.3643 |
| 661 | 38.342 | 91.2852 | | 588 | 6.11658 | 31.9605 |
| 660 | 37.7594 | 91.2132 | | 587 | 5.7661 | 30.0657 |
| 659 | 37.2497 | 91.2697 | | 586 | 5.57644 | 29.0719 |
| 658 | 36.7144 | 91.3021 | | 585 | 5.49815 | 28.6708 |
| 657 | 37.7352 | 95.5069 | 55 | 584 | 5.5378 | 28.8438 |
| 656 | 35.3123 | 89.3696 | | 583 | 5.77811 | 30.0534 |
| 655 | 33.4552 | 86.608 | | 582 | 6.09584 | 31.6914 |
| 654 | 34.3453 | 90.2593 | | 581 | 6.44674 | 33.5255 |
| 653 | 33.5324 | 89.4374 | | 580 | 6.99171 | 36.2867 |
| 652 | 33.1266 | 89.7527 | | 579 | 7.65567 | 39.7539 |
| 651 | 32.6654 | 89.8865 | 60 | 578 | 8.37484 | 43.4457 |
| 650 | 32.2244 | 90.0699 | | 577 | 9.03742 | 46.8255 |
| 649 | 31.8078 | 90.297 | | 576 | 9.75237 | 50.4115 |
| 648 | 31.3129 | 90.3716 | | 575 | 10.5515 | 54.4274 |
| 647 | 30.6858 | 89.8931 | | 574 | 11.1651 | 57.3381 |
| 646 | 30.0568 | 89.4259 | | 573 | 11.7695 | 60.2867 |
| 645 | 29.5078 | 89.2411 | 65 | 572 | 12.3657 | 62.9921 |
| 644 | 29.0053 | 89.2043 | | 571 | 12.8199 | 64.9855 |

-continued

-continued

| Wavelength (nm) | Transmission (%) in activated state of the photochromic compound | Transmission (%) in deactivated state of the photochromic compound | | Wavelength (nm) | Transmission (%) in activated state of the photochromic compound | Transmission (%) in deactivated state of the photochromic compound |
|---|---|---|---|---|---|---|
| 570 | 13.2528 | 66.7717 | | 497 | 45.0426 | 86.0341 |
| 569 | 13.589 | 68.0415 | | 496 | 45.4643 | 86.1046 |
| 568 | 13.9238 | 69.239 | | 495 | 45.9071 | 86.3074 |
| 567 | 14.1861 | 70.043 | 10 | 494 | 46.3824 | 86.5805 |
| 566 | 14.4439 | 70.7214 | | 493 | 46.7422 | 86.6966 |
| 565 | 14.6929 | 71.3062 | | 492 | 47.0841 | 86.8386 |
| 564 | 14.9119 | 71.697 | | 491 | 47.3757 | 86.9919 |
| 563 | 15.1256 | 72.019 | | 490 | 47.6131 | 87.0533 |
| 562 | 15.3652 | 72.4094 | | 489 | 47.7026 | 86.9687 |
| 561 | 15.6121 | 72.7972 | 15 | 488 | 47.4603 | 86.3328 |
| 560 | 15.83 | 73.0287 | | 487 | 47.9056 | 86.8965 |
| 559 | 16.0912 | 73.4052 | | 486 | 49.1377 | 89.0397 |
| 558 | 16.3666 | 73.7973 | | 485 | 46.9922 | 85.4329 |
| 557 | 16.6382 | 74.122 | | 484 | 47.492 | 86.7969 |
| 556 | 16.948 | 74.5253 | | 483 | 46.9971 | 86.2824 |
| 555 | 17.2135 | 74.7704 | 20 | 482 | 46.702 | 86.244 |
| 554 | 17.5224 | 75.1479 | | 481 | 46.2752 | 86.1585 |
| 553 | 17.8249 | 75.4494 | | 480 | 45.7353 | 85.8991 |
| 552 | 18.1274 | 75.7674 | | 479 | 45.1594 | 85.811 |
| 551 | 18.428 | 75.9418 | | 478 | 44.4863 | 85.6782 |
| 550 | 18.7403 | 76.1988 | | 477 | 43.7205 | 85.5356 |
| 549 | 19.0394 | 76.4495 | | 476 | 42.9819 | 85.5394 |
| 548 | 19.3582 | 76.6386 | 25 | 475 | 42.1288 | 85.4147 |
| 547 | 19.6123 | 76.6 | | 474 | 41.1964 | 85.3395 |
| 546 | 19.9075 | 76.6528 | | 473 | 40.2189 | 85.2655 |
| 545 | 20.1803 | 76.6276 | | 472 | 39.1428 | 85.1111 |
| 544 | 20.4272 | 76.4807 | | 471 | 38.0505 | 84.9851 |
| 543 | 20.6732 | 76.2999 | | 470 | 36.9279 | 84.9012 |
| 542 | 20.8874 | 76.0193 | 30 | 469 | 35.8238 | 84.9314 |
| 541 | 21.0931 | 75.7094 | | 468 | 34.648 | 84.7299 |
| 540 | 21.2895 | 75.2589 | | 467 | 33.4769 | 84.6108 |
| 539 | 21.4958 | 74.9367 | | 466 | 32.4593 | 84.7735 |
| 538 | 21.6831 | 74.4895 | | 465 | 31.3439 | 84.6506 |
| 537 | 21.9192 | 74.1608 | | 464 | 30.2256 | 84.5397 |
| 536 | 22.23 | 74.0619 | 35 | 463 | 29.0503 | 84.1374 |
| 535 | 22.5798 | 74.1163 | | 462 | 28.0397 | 84.0943 |
| 534 | 23.0373 | 74.495 | | 461 | 27.1487 | 84.069 |
| 533 | 23.5669 | 75.046 | | 460 | 26.3028 | 83.9931 |
| 532 | 24.221 | 75.9596 | | 459 | 25.4815 | 83.784 |
| 531 | 24.9263 | 76.9902 | | 458 | 24.7742 | 83.725 |
| 530 | 25.692 | 78.111 | 40 | 457 | 24.0713 | 83.3837 |
| 529 | 26.4512 | 79.1675 | | 456 | 23.5439 | 83.3532 |
| 528 | 27.1396 | 79.9849 | | 455 | 23.0646 | 83.1809 |
| 527 | 27.8832 | 80.8781 | | 454 | 22.6313 | 82.8329 |
| 526 | 28.5484 | 81.4946 | | 453 | 22.3502 | 82.7575 |
| 525 | 29.2286 | 82.1414 | | 452 | 22.1021 | 82.5639 |
| 524 | 29.8924 | 82.6697 | 45 | 451 | 21.9202 | 82.3924 |
| 523 | 30.5153 | 83.0543 | | 450 | 21.8471 | 82.2971 |
| 522 | 31.1774 | 83.505 | | 449 | 21.7667 | 82.0353 |
| 521 | 31.781 | 83.7763 | | 448 | 21.7572 | 81.8878 |
| 520 | 32.4333 | 84.1584 | | 447 | 21.8422 | 81.9108 |
| 519 | 33.0283 | 84.3599 | | 446 | 21.8464 | 81.6045 |
| 518 | 33.6145 | 84.5202 | 50 | 445 | 21.9412 | 81.5875 |
| 517 | 34.2336 | 84.7763 | | 444 | 22.0302 | 81.5633 |
| 516 | 34.8183 | 84.8614 | | 443 | 22.0266 | 81.199 |
| 515 | 35.3796 | 84.9395 | | 442 | 22.1645 | 81.4436 |
| 514 | 35.9691 | 85.0386 | | 441 | 22.1006 | 80.9778 |
| 513 | 36.5308 | 85.074 | | 440 | 22.0123 | 80.5808 |
| 512 | 37.0823 | 85.0552 | | 439 | 22.0061 | 80.498 |
| 511 | 37.6486 | 85.1211 | 55 | 438 | 21.853 | 80.0112 |
| 510 | 38.1565 | 85.0269 | | 437 | 21.7289 | 79.6814 |
| 509 | 38.7236 | 85.1021 | | 436 | 21.5032 | 79.089 |
| 508 | 39.1949 | 84.9787 | | 435 | 21.2931 | 78.4845 |
| 507 | 39.768 | 85.0428 | | 434 | 21.1643 | 78.2007 |
| 506 | 40.2729 | 84.9946 | | 433 | 20.7843 | 76.9986 |
| 505 | 40.7736 | 84.9401 | 60 | 432 | 20.4443 | 75.8755 |
| 504 | 41.3436 | 85.0426 | | 431 | 20.2937 | 75.2441 |
| 503 | 41.8371 | 85.0416 | | 430 | 20.0112 | 74.0771 |
| 502 | 42.3834 | 85.1549 | | 429 | 19.5618 | 72.1249 |
| 501 | 42.8838 | 85.2261 | | 428 | 19.2737 | 70.5192 |
| 500 | 43.4622 | 85.4443 | | 427 | 18.8565 | 68.258 |
| 499 | 43.9754 | 85.5823 | 65 | 426 | 18.4499 | 65.7586 |
| 498 | 44.412 | 85.61 | | 425 | 18.0282 | 63.0689 |

-continued

| Wavelength (nm) | Transmission (%) in activated state of the photochromic compound | Transmission (%) in deactivated state of the photochromic compound |
|---|---|---|
| 424 | 17.511 | 59.8337 |
| 423 | 16.9677 | 56.438 |
| 422 | 16.4309 | 53.0154 |
| 421 | 15.7472 | 49.1441 |
| 420 | 15.0136 | 45.1449 |
| 419 | 14.2691 | 41.3208 |
| 418 | 13.484 | 37.5545 |
| 417 | 12.7209 | 34.1144 |
| 416 | 11.9644 | 30.8801 |
| 415 | 11.2075 | 28.0125 |
| 414 | 10.5074 | 25.5147 |
| 413 | 9.84363 | 23.3799 |
| 412 | 9.16792 | 21.4617 |
| 411 | 8.56908 | 19.9245 |
| 410 | 8.00441 | 18.6675 |
| 409 | 7.49069 | 17.6428 |
| 408 | 6.97007 | 16.7303 |
| 407 | 6.47531 | 15.9625 |
| 406 | 6.03532 | 15.3513 |
| 405 | 5.58862 | 14.7229 |
| 404 | 5.11882 | 14.0689 |
| 403 | 4.65214 | 13.3781 |
| 402 | 4.2175 | 12.6268 |
| 401 | 3.78012 | 11.7561 |
| 400 | 3.33214 | 10.757 |
| 399 | 2.92672 | 9.75203 |
| 398 | 2.5231 | 8.62684 |
| 397 | 2.13443 | 7.42633 |
| 396 | 1.78239 | 6.26664 |
| 395 | 1.46929 | 5.1659 |
| 394 | 1.17503 | 4.16045 |
| 393 | 0.933217 | 3.32176 |
| 392 | 0.702792 | 2.57788 |
| 391 | 0.523622 | 1.97278 |
| 390 | 0.381591 | 1.51632 |
| 389 | 0.265085 | 1.14848 |
| 388 | 0.181736 | 0.876574 |
| 387 | 0.11391 | 0.680186 |
| 386 | 0.0287124 | 0.511865 |
| 385 | 0.0118862 | 0.387643 |
| 384 | 0.0583088 | 0.283008 |
| 383 | 0.0751995 | 0.227959 |
| 382 | 0.117482 | 0.131935 |
| 381 | 0.0824619 | 0.154592 |
| 380 | 0.0449184 | 0.285981 |

Turning to FIG. 4 showing a second example of transmission spectra of the ophthalmic article in FIG. 1 or 2.

The example of FIG. 4 differs from that in FIG. 3, by a slightly different composition of the composition of the solvent dyes.

The ophthalmic article 1 presents a first transmission spectrum 200 in an activated state of the photochromic filter compound 15 and a second transmission spectrum 202 in a deactivated state of the photochromic filter compound 15, such that:

the first 200 and the second 202 transmission spectrum at wavelengths lower than 380 nm is lower than 1%, in particular 0.03%, the first 200 and the second 202 transmission spectrum have a respective relative first maximum, Max_1_deactivated and Max_1_activated, between 460 nm and 510 nm, the first 200 and the second 202 transmission spectrum have a respective relative first minimum Min_1_deactivated and Min_1_activated, between 560 nm and 610 nm, and $$\frac{T_v^{deactivated}}{T_v^{activated}} > 2.5.$$

In this specific example $$\frac{T_v^{deactivated}}{T_v^{activated}}$$

is about 2.96.

As can be seen in FIG. 4, the luminous transmittance $$T_v^{activated}$$

according to ISO 13666 is lower than 30%, in particular equal to 26%, in the activated state of the photochromic filter compound 15 and the luminous transmittance $$T_v^{deactivated}$$

according to ISO_13666 is higher than 75% in the deactivated state of the photochromic filter compound 15.

In the activated state of the photochromic filter compound 15, the transmission of the first spectrum 200 is less than 30%, in particular less than 26%, between 425 nm and 450 nm.

Between 430 nm and 450 nm, in the activated state of the photochromic filter compound 15, the transmission is nearly constant with a variation of less than 2% and transmission values in this wavelength range are comprised between 25.4% and 27.4%. This part of the spectrum 200 in the activated state of the photochromic filter compound contributes the improvement of circadian perception of the user.

As can be seen in FIG. 4, said first maxima Max_1_deactivated and Max_1_activated, of respective first 200 and the second 202 spectrum are distant less than 5 nm from each other and said first minima, Min_1_deactivated and Min_1_activated, of respective first 200 and the second 202 spectrum and are distant less than 5 nm from each other, in the present example they are at the same wavelength.

In this case:

(Max_1_deactivated)=486 nm (Max_1_activated)=487 nm (Min_1_deactivated)=585 nm (Min_1_activated)=585 nm The relationship of the transmission in the activated and deactivated state at the maxima is $$\frac{T_{MAX1}^{deactivated}}{T_{MAX1}^{activated}} > 1.5;$$

in this particular case $$\frac{T_{MAX1}^{deactivated}}{T_{MAX1}^{activated}} = 1.54.$$

The relationship of the transmission in the activated and deactivated state at the minima is $$\frac{T_{MIN1}^{deactivated}}{T_{MIN1}^{activated}} > 3.5;$$

in this particular case $$\frac{T_{MIN1}^{deactivated}}{T_{MIN1}^{activated}} = 3.55$$

In particular, the transmission between 435 nm and 530 nm is equal or higher than 75% for the second transmission spectrum 202 in the deactivated state of the photochromic filter compound 15.

The first relative minimum Min_1_deactivated has a transmission of 30% or less for the second transmission spectrum 202 in the deactivated state of the photochromic filter compound 15.

The transmission at a wavelength equal or superior to 610 nm is equal or higher than 75% for the second transmission spectrum 202 in the deactivated state of the photochromic filter compound 15.

In addition, the second transmission spectrum 202 in the deactivated state of the photochromic filter compound presents a second relative minimum Min_2_deactivated at 536 nm with a transmission comprised between 65% and 70%. The second transmission spectrum 202 in the deactivated state of the photochromic filter compound 15 presents a second relative maximum Max_2_deactivated at 547 nm+/−3 nm with a transmission comprised between 70% and 75%.

The first relative maximum Max_1_activated of the first transmission spectrum 200 in the activated state of the photochromic filter compound 15 presents a transmission comprised between 50% and 55%.

The first relative minimum MIN_1_activated has a transmission of 10% or less for the first transmission spectrum 200 in the activated state of the photochromic filter compound 15.

The following table shows the measured transmission value in percentage according to the example of FIG. 4.

| Wavelength (nm) | Transmission (%) in deactivated state of the photochromic compound | Transmission (%) in activated state of the photochromic compound |
|---|---|---|
| 780 | 90.3826 | 93.2376 |
| 779 | 90.3324 | 93.1941 |
| 778 | 90.3359 | 93.1585 |
| 777 | 90.3521 | 93.1856 |
| 776 | 90.3652 | 93.1977 |
| 775 | 90.3713 | 93.1770 |
| 774 | 90.3540 | 93.1354 |
| 773 | 90.3542 | 93.0618 |
| 772 | 90.3071 | 93.0478 |
| 771 | 90.2739 | 92.9712 |
| 770 | 90.2832 | 92.8982 |
| 769 | 90.2256 | 92.9018 |
| 768 | 90.2497 | 92.7848 |
| 767 | 90.3152 | 92.8869 |
| 766 | 90.2606 | 92.8743 |
| 765 | 90.2231 | 92.6645 |
| 764 | 90.1927 | 92.5265 |

-continued

| Wavelength (nm) | Transmission (%) in deactivated state of the photochromic compound | Transmission (%) in activated state of the photochromic compound |
|---|---|---|
| 763 | 90.2237 | 92.5516 |
| 762 | 90.2003 | 92.5677 |
| 761 | 90.1389 | 92.4459 |
| 760 | 90.1082 | 92.2444 |
| 759 | 90.1309 | 92.2783 |
| 758 | 90.0792 | 92.2367 |
| 757 | 90.0463 | 92.0425 |
| 756 | 90.0355 | 92.0394 |
| 755 | 90.0419 | 91.9931 |
| 754 | 90.0101 | 91.9611 |
| 753 | 90.0394 | 91.7974 |
| 752 | 90.0135 | 91.7745 |
| 751 | 89.9865 | 91.6261 |
| 750 | 89.9353 | 91.4654 |
| 749 | 89.9433 | 91.3346 |
| 748 | 89.9186 | 91.2853 |
| 747 | 89.9112 | 91.1072 |
| 746 | 89.8792 | 91.0100 |
| 745 | 89.8569 | 90.8542 |
| 744 | 89.8674 | 90.6985 |
| 743 | 89.8282 | 90.5459 |
| 742 | 89.8398 | 90.3656 |
| 741 | 89.8528 | 90.2462 |
| 740 | 89.7735 | 90.0917 |
| 739 | 89.7997 | 89.7458 |
| 738 | 89.8238 | 89.6584 |
| 737 | 89.7577 | 89.3928 |
| 736 | 89.7700 | 89.1432 |
| 735 | 89.7417 | 88.9780 |
| 734 | 89.7257 | 88.6456 |
| 733 | 89.7241 | 88.4027 |
| 732 | 89.6880 | 88.1918 |
| 731 | 89.6799 | 87.8493 |
| 730 | 89.6331 | 87.5713 |
| 729 | 89.6133 | 87.2878 |
| 728 | 89.6101 | 86.9496 |
| 727 | 89.6054 | 86.6356 |
| 726 | 89.5607 | 86.2812 |
| 725 | 89.5415 | 85.8830 |
| 724 | 89.5304 | 85.5614 |
| 723 | 89.5164 | 85.1494 |
| 722 | 89.4954 | 84.7701 |
| 721 | 89.4732 | 84.3116 |
| 720 | 89.4349 | 83.8758 |
| 719 | 89.3882 | 83.4368 |
| 718 | 89.3594 | 82.9383 |
| 717 | 89.3528 | 82.5201 |
| 716 | 89.3069 | 82.0079 |
| 715 | 89.2755 | 81.4627 |
| 714 | 89.2559 | 80.8709 |
| 713 | 89.2131 | 80.2949 |
| 712 | 89.1676 | 79.7582 |
| 711 | 89.1236 | 79.1454 |
| 710 | 89.0893 | 78.5234 |
| 709 | 89.0465 | 77.9244 |
| 708 | 88.9986 | 77.2787 |
| 707 | 88.9401 | 76.5892 |
| 706 | 88.9114 | 75.9532 |
| 705 | 88.8706 | 75.3638 |
| 704 | 88.8439 | 74.6776 |
| 703 | 88.7790 | 73.9587 |
| 702 | 88.7257 | 73.2157 |
| 701 | 88.6753 | 72.5284 |
| 700 | 88.6167 | 71.8149 |
| 699 | 88.5868 | 71.0715 |
| 698 | 88.5287 | 70.3330 |
| 697 | 88.4848 | 69.5369 |
| 696 | 88.4226 | 68.8337 |
| 695 | 88.3663 | 68.0679 |
| 694 | 88.2837 | 67.3325 |
| 693 | 88.2363 | 66.5321 |
| 692 | 88.1715 | 65.8192 |
| 691 | 88.1187 | 64.9991 |

-continued

-continued

| Wavelength (nm) | Transmission (%) in deactivated state of the photochromic compound | Transmission (%) in activated state of the photochromic compound |
| --- | --- | --- |
| 690 | 88.0590 | 64.3024 |
| 689 | 88.0182 | 63.5325 |
| 688 | 87.9288 | 62.7899 |
| 687 | 87.8412 | 62.0247 |
| 686 | 87.7962 | 61.2799 |
| 685 | 87.7348 | 60.5126 |
| 684 | 87.6570 | 59.7863 |
| 683 | 87.6005 | 59.0740 |
| 682 | 87.4847 | 58.3950 |
| 681 | 87.4441 | 57.6458 |
| 680 | 87.3794 | 56.9541 |
| 679 | 87.3145 | 56.2364 |
| 678 | 87.2206 | 55.5381 |
| 677 | 87.1534 | 54.8787 |
| 676 | 87.0640 | 54.2120 |
| 675 | 87.0071 | 53.5736 |
| 674 | 86.9315 | 52.9113 |
| 673 | 86.8351 | 52.2873 |
| 672 | 86.7701 | 51.5793 |
| 671 | 86.6677 | 50.9561 |
| 670 | 86.6059 | 50.4148 |
| 669 | 86.4623 | 49.7627 |
| 668 | 86.3768 | 49.1427 |
| 667 | 86.3146 | 48.5507 |
| 666 | 86.2393 | 47.9649 |
| 665 | 86.1551 | 47.3642 |
| 664 | 86.0540 | 46.7662 |
| 663 | 85.9529 | 46.2239 |
| 662 | 85.8630 | 45.6494 |
| 661 | 85.7939 | 45.0668 |
| 660 | 85.7149 | 44.5121 |
| 659 | 85.6365 | 43.9895 |
| 658 | 85.8930 | 43.4159 |
| 657 | 86.2472 | 44.6398 |
| 656 | 86.5526 | 41.5447 |
| 655 | 86.1154 | 38.6140 |
| 654 | 85.0701 | 41.6524 |
| 653 | 85.1219 | 40.5102 |
| 652 | 84.9794 | 40.1180 |
| 651 | 84.8491 | 39.5712 |
| 650 | 84.6957 | 39.0350 |
| 649 | 84.5917 | 38.4806 |
| 648 | 84.4855 | 37.9318 |
| 647 | 84.4862 | 37.4457 |
| 646 | 84.5371 | 36.9343 |
| 645 | 84.5669 | 36.3977 |
| 644 | 84.5194 | 35.8832 |
| 643 | 84.3677 | 35.3556 |
| 642 | 84.1681 | 34.8329 |
| 641 | 84.0728 | 34.2913 |
| 640 | 84.0075 | 33.8087 |
| 639 | 83.9105 | 33.2654 |
| 638 | 83.7576 | 32.7504 |
| 637 | 83.6875 | 32.2879 |
| 636 | 83.6414 | 31.7741 |
| 635 | 83.5275 | 31.2854 |
| 634 | 83.4399 | 30.8113 |
| 633 | 83.3869 | 30.3407 |
| 632 | 83.2862 | 29.8913 |
| 631 | 83.1256 | 29.4167 |
| 630 | 82.9117 | 28.9829 |
| 629 | 82.7950 | 28.5162 |
| 628 | 82.6890 | 28.1592 |
| 627 | 82.6088 | 27.6676 |
| 626 | 82.5464 | 27.3070 |
| 625 | 82.4189 | 26.8903 |
| 624 | 81.8850 | 26.5115 |
| 623 | 81.4390 | 26.1522 |
| 622 | 81.4072 | 25.7495 |
| 621 | 81.6423 | 25.5050 |
| 620 | 81.5944 | 25.1262 |
| 619 | 81.4958 | 24.9038 |
| 618 | 81.8514 | 24.6295 |

| Wavelength (nm) | Transmission (%) in deactivated state of the photochromic compound | Transmission (%) in activated state of the photochromic compound |
| --- | --- | --- |
| 617 | 81.5187 | 24.2972 |
| 616 | 81.0575 | 24.0381 |
| 615 | 80.5512 | 23.7024 |
| 614 | 80.1857 | 23.4388 |
| 613 | 79.8181 | 23.1637 |
| 612 | 79.4405 | 22.9102 |
| 611 | 79.0472 | 22.6588 |
| 610 | 78.5882 | 22.3347 |
| 609 | 78.0294 | 22.1007 |
| 608 | 77.4437 | 21.7757 |
| 607 | 76.7753 | 21.5033 |
| 606 | 76.0547 | 21.1790 |
| 605 | 75.0777 | 20.7915 |
| 604 | 74.0449 | 20.5283 |
| 603 | 72.8747 | 20.0650 |
| 602 | 71.4074 | 19.6508 |
| 601 | 69.8155 | 19.1759 |
| 600 | 67.9558 | 18.6098 |
| 599 | 65.8808 | 17.9942 |
| 598 | 63.3438 | 17.2833 |
| 597 | 60.4620 | 16.5680 |
| 596 | 57.3142 | 15.7894 |
| 595 | 53.9998 | 14.8695 |
| 594 | 50.2967 | 13.9179 |
| 593 | 46.7917 | 12.8816 |
| 592 | 42.8798 | 11.8996 |
| 591 | 39.1014 | 10.9804 |
| 590 | 35.8127 | 10.1037 |
| 589 | 32.8674 | 9.3338 |
| 588 | 30.5884 | 8.7019 |
| 587 | 28.9562 | 8.2015 |
| 586 | 27.9064 | 7.9416 |
| 585 | 27.6213 | 7.7759 |
| 584 | 27.8781 | 7.8720 |
| 583 | 28.8355 | 8.2059 |
| 582 | 30.3548 | 8.4950 |
| 581 | 32.2846 | 8.8845 |
| 580 | 34.8274 | 9.6314 |
| 579 | 37.9290 | 10.5354 |
| 578 | 41.2649 | 11.3774 |
| 577 | 44.5591 | 12.1254 |
| 576 | 47.9069 | 13.0864 |
| 575 | 51.2933 | 14.0715 |
| 574 | 54.1961 | 14.7231 |
| 573 | 56.7491 | 15.5221 |
| 572 | 59.1123 | 16.2303 |
| 571 | 61.0034 | 16.7431 |
| 570 | 62.5820 | 17.2478 |
| 569 | 63.7690 | 17.6713 |
| 568 | 64.7341 | 18.1029 |
| 567 | 65.4774 | 18.4341 |
| 566 | 66.0512 | 18.7454 |
| 565 | 66.5372 | 19.0290 |
| 564 | 66.9375 | 19.2707 |
| 563 | 67.2409 | 19.5252 |
| 562 | 67.5779 | 19.7986 |
| 561 | 67.9382 | 20.0576 |
| 560 | 68.2131 | 20.2998 |
| 559 | 68.5259 | 20.6200 |
| 558 | 68.8641 | 20.9382 |
| 557 | 69.1830 | 21.2284 |
| 556 | 69.5775 | 21.5441 |
| 555 | 69.8629 | 21.8094 |
| 554 | 70.1603 | 22.1951 |
| 553 | 70.4675 | 22.4974 |
| 552 | 70.7333 | 22.8040 |
| 551 | 70.9445 | 23.1353 |
| 550 | 71.1209 | 23.4982 |
| 549 | 71.2799 | 23.8222 |
| 548 | 71.4677 | 24.1060 |
| 547 | 71.4985 | 24.4172 |
| 546 | 71.4740 | 24.7461 |
| 545 | 71.4784 | 25.0063 |

-continued

-continued

| Wavelength (nm) | Transmission (%) in deactivated state of the photochromic compound | Transmission (%) in activated state of the photochromic compound |
|---|---|---|
| 544 | 71.3882 | 25.2396 |
| 543 | 71.2346 | 25.5003 |
| 542 | 70.9969 | 25.7534 |
| 541 | 70.6996 | 25.9675 |
| 540 | 70.3827 | 26.1827 |
| 539 | 70.0742 | 26.3950 |
| 538 | 69.7566 | 26.5858 |
| 537 | 69.4776 | 26.8784 |
| 536 | 69.4221 | 27.2185 |
| 535 | 69.5847 | 27.5756 |
| 534 | 69.9618 | 28.0631 |
| 533 | 70.6068 | 28.6305 |
| 532 | 71.4302 | 29.3954 |
| 531 | 72.3978 | 30.1629 |
| 530 | 73.4224 | 30.9608 |
| 529 | 74.4070 | 31.7316 |
| 528 | 75.1894 | 32.4458 |
| 527 | 75.8947 | 33.2331 |
| 526 | 76.4357 | 33.9000 |
| 525 | 76.9131 | 34.6166 |
| 524 | 77.3633 | 35.2233 |
| 523 | 77.6550 | 35.8507 |
| 522 | 77.9000 | 36.5294 |
| 521 | 78.1665 | 37.0930 |
| 520 | 78.4528 | 37.7750 |
| 519 | 78.6226 | 38.2977 |
| 518 | 78.7283 | 38.9070 |
| 517 | 78.9544 | 39.5402 |
| 516 | 79.1476 | 40.0918 |
| 515 | 79.2356 | 40.7104 |
| 514 | 79.3528 | 41.3119 |
| 513 | 79.4813 | 41.9155 |
| 512 | 79.6112 | 42.5377 |
| 511 | 79.7992 | 43.1412 |
| 510 | 79.9061 | 43.7110 |
| 509 | 80.0736 | 44.3694 |
| 508 | 80.1945 | 44.8736 |
| 507 | 80.2991 | 45.5458 |
| 506 | 80.4788 | 46.0032 |
| 505 | 80.5413 | 46.6144 |
| 504 | 80.6573 | 47.2097 |
| 503 | 80.7954 | 47.6889 |
| 502 | 80.8781 | 48.2062 |
| 501 | 80.9196 | 48.7110 |
| 500 | 81.0284 | 49.2584 |
| 499 | 81.1248 | 49.6554 |
| 498 | 81.0783 | 50.1714 |
| 497 | 81.2904 | 50.7018 |
| 496 | 81.4043 | 50.8582 |
| 495 | 81.4412 | 51.4314 |
| 494 | 81.5800 | 51.7659 |
| 493 | 81.6564 | 52.0726 |
| 492 | 81.7146 | 52.3976 |
| 491 | 81.7663 | 52.6782 |
| 490 | 81.8153 | 52.8993 |
| 489 | 81.8151 | 53.0605 |
| 488 | 81.4512 | 53.0905 |
| 487 | 81.6271 | 54.2149 |
| 486 | 83.3659 | 53.4398 |
| 485 | 82.5312 | 51.2472 |
| 484 | 81.8505 | 53.0966 |
| 483 | 81.8595 | 52.5920 |
| 482 | 81.8793 | 52.3489 |
| 481 | 81.8892 | 51.9299 |
| 480 | 81.7693 | 51.3263 |
| 479 | 81.6862 | 50.9089 |
| 478 | 81.6416 | 50.2085 |
| 477 | 81.5038 | 49.5449 |
| 476 | 81.4832 | 48.7640 |
| 475 | 81.4381 | 47.7868 |
| 474 | 81.2778 | 46.9031 |
| 473 | 81.2208 | 45.8699 |
| 472 | 81.0151 | 44.8916 |

| Wavelength (nm) | Transmission (%) in deactivated state of the photochromic compound | Transmission (%) in activated state of the photochromic compound |
|---|---|---|
| 471 | 80.8737 | 43.8162 |
| 470 | 80.6974 | 42.6601 |
| 469 | 80.6229 | 41.5185 |
| 468 | 80.4893 | 40.2504 |
| 467 | 80.3304 | 39.1480 |
| 466 | 80.4111 | 37.9641 |
| 465 | 80.2829 | 36.7109 |
| 464 | 80.0814 | 35.6241 |
| 463 | 79.7952 | 34.5045 |
| 462 | 79.6029 | 33.5971 |
| 461 | 79.6140 | 32.5404 |
| 460 | 79.4781 | 31.6092 |
| 459 | 79.3613 | 30.7709 |
| 458 | 79.2425 | 30.0467 |
| 457 | 79.0401 | 29.3014 |
| 456 | 78.9426 | 28.7962 |
| 455 | 78.8727 | 28.2812 |
| 454 | 78.6345 | 27.8557 |
| 453 | 78.5617 | 27.5945 |
| 452 | 78.5448 | 27.3251 |
| 451 | 78.4179 | 27.1727 |
| 450 | 78.3450 | 27.0589 |
| 449 | 78.2706 | 26.9708 |
| 448 | 78.1261 | 27.0105 |
| 447 | 78.0621 | 27.0853 |
| 446 | 77.9740 | 27.0670 |
| 445 | 77.8155 | 27.2369 |
| 444 | 77.7574 | 27.2859 |
| 443 | 77.5720 | 27.2894 |
| 442 | 77.5169 | 27.4134 |
| 441 | 77.2940 | 27.3096 |
| 440 | 76.8361 | 27.4321 |
| 439 | 76.6580 | 27.3829 |
| 438 | 76.2469 | 27.2693 |
| 437 | 75.9036 | 27.1832 |
| 436 | 75.3884 | 27.0303 |
| 435 | 74.7818 | 26.8290 |
| 434 | 74.5167 | 26.6206 |
| 433 | 73.4590 | 26.2973 |
| 432 | 72.2814 | 26.1117 |
| 431 | 71.5265 | 25.8289 |
| 430 | 70.5429 | 25.4006 |
| 429 | 68.8646 | 24.9608 |
| 428 | 67.0000 | 24.7327 |
| 427 | 64.9240 | 24.3438 |
| 426 | 62.4915 | 23.9717 |
| 425 | 59.9892 | 23.4946 |
| 424 | 57.1099 | 22.9355 |
| 423 | 53.8836 | 22.4267 |
| 422 | 50.7057 | 21.7901 |
| 421 | 47.3370 | 21.0135 |
| 420 | 43.5717 | 20.2948 |
| 419 | 39.9514 | 19.5144 |
| 418 | 36.4952 | 18.6341 |
| 417 | 33.1414 | 17.7649 |
| 416 | 30.1455 | 16.8640 |
| 415 | 27.3816 | 15.9518 |
| 414 | 24.9574 | 15.1053 |
| 413 | 22.8785 | 14.2412 |
| 412 | 21.0754 | 13.4346 |
| 411 | 19.5171 | 12.6959 |
| 410 | 18.2939 | 12.0097 |
| 409 | 17.3224 | 11.3448 |
| 408 | 16.4650 | 10.6995 |
| 407 | 15.6855 | 10.1147 |
| 406 | 15.0879 | 9.5253 |
| 405 | 14.4987 | 8.8928 |
| 404 | 13.8707 | 8.2739 |
| 403 | 13.1831 | 7.6697 |
| 402 | 12.4013 | 7.0750 |
| 401 | 11.5276 | 6.4347 |
| 400 | 10.5936 | 5.7679 |
| 399 | 9.5509 | 5.1489 |

-continued

| Wavelength (nm) | Transmission (%) in deactivated state of the photochromic compound | Transmission (%) in activated state of the photochromic compound |
|---|---|---|
| 398 | 8.4592 | 4.4955 |
| 397 | 7.3020 | 3.8656 |
| 396 | 6.1274 | 3.2953 |
| 395 | 5.1116 | 2.7352 |
| 394 | 4.0828 | 2.2590 |
| 393 | 3.3241 | 1.8118 |
| 392 | 2.6255 | 1.4433 |
| 391 | 2.0145 | 1.0953 |
| 390 | 1.5627 | 0.8493 |
| 389 | 1.2144 | 0.6327 |
| 388 | 0.9387 | 0.4672 |
| 387 | 0.7175 | 0.3337 |
| 386 | 0.5776 | 0.2241 |
| 385 | 0.4430 | 0.1367 |
| 384 | 0.3042 | 0.0236 |
| 383 | 0.2719 | 0.0194 |
| 382 | 0.1745 | 0.0643 |
| 381 | 0.2547 | 0.1008 |
| 380 | 0.3819 | 0.1978 |

Turning to FIG. 5 showing a third example of transmission spectra of the ophthalmic article in FIG. 1 or 2.

The example of FIG. 5 differs from that in FIG. 4, by a clearer faded (non-activated) state.

The ophthalmic article 1 presents a first transmission spectrum 300 in an activated state of the photochromic filter compound 15 and a second transmission spectrum 302 in a deactivated state of the photochromic filter compound 15, such that:

the first 300 and the second 302 transmission spectrum at wavelengths lower than 380 nm is lower than 1%, in particular 0.03%, the first 300 and the second 302 transmission spectrum have a respective relative first maximum, Max_1_deactivated and Max_1_activated, between 460 nm and 510 nm, the first 300 and the second 302 transmission spectrum have a respective relative first minimum Min_1_deactivated and Min_1_activated, between 560 nm and 610 nm, and $$\frac{T_v^{deactivated}}{T_v^{activated}} > 2.5,$$

specifically 2.96 in this case.

As can be seen in FIG. 5, the luminous transmittance $$T_v^{activated}$$

according to ISO_13666 is lower than 30% in the activated state of the photochromic filter compound 15 and the luminous transmittance $$T_v^{deactivated}$$

according to ISO_13666 is higher than 75% in the deactivated state of the photochromic filter compound 15.

In the activated state of the photochromic filter compound 15, the transmission of the first spectrum 300 is less than 30%, in particular equal or less than 26%, between 425 nm and 450 nm.

Between 435 nm and 450 nm, in the activated state of the photochromic filter compound 15, the transmission is nearly constant with a variation of less than 2%, even less than 1%, and transmission values comprised between 24.67% and This part of the spectrum 300 in the activated state of the photochromic filter compound contributes the improvement of circadian perception of the user. As can be seen in FIG. 5, said first maxima, Max_1_deactivated and Max_1_activated of respective first 300 and the second 302 spectrum are distant equal to or less than 6 nm from each other and said first minima, Min_1_deactivated and Min_1_activated, of respective first 300 and the second 302 spectrum and are distant less than 5 nm from each other, in the present example they are at the same wavelength.

In this case:

(Max_1_deactivated)=495 nm (Max_1_activated)=489 nm (Min_1_deactivated)=585 nm (Min_1_activated)=585 nm The relationship of the transmission in the activated and deactivated state at the maxima is $$\frac{T_{MAX1}^{deactivated}}{T_{MAX1}^{activated}} > 1.5;$$

in this specific case $$\frac{T_{MAX1}^{deactivated}}{T_{MAX1}^{activated}} = 1.64.$$

The relationship of the transmission in the activated and deactivated state at the minima is $$\frac{T_{MIN1}^{activated}}{T_{MIN1}^{deactivated}} > 3.5;$$

in this specific case $$\frac{T_{MIN1}^{activated}}{T_{MIN1}^{deactivated}} = 4.22.$$

In particular, the transmission between 435 nm and 530 nm is equal or higher than 75% for the second transmission spectrum 302 in the deactivated state of the photochromic filter compound 15.

The first relative minimum Min_1_deactivated has a transmission of 35% or less for the second transmission spectrum 302 in the deactivated state of the photochromic filter compound 15.

The transmission at a wavelength equal or superior to 610 nm is equal or higher than 80%, in particular 85% for the second transmission spectrum 302 in the deactivated state of the photochromic filter compound 15.

In addition, the second transmission spectrum 302 in the deactivated state of the photochromic filter compound presents a second relative minimum Min_2_deactivated at 536 nm+/−3 nm with a transmission comprised between 75% and 80%.

The second transmission spectrum 302 in the deactivated state of the photochromic filter compound 15 presents a second relative maximum Max_2_deactivated at 547 nm+/−3 nm with a transmission comprised between 70% and 85%.

The first relative maximum Max_1_activated of the first transmission spectrum 300 in the activated state of the photochromic filter compound 15 presents a transmission comprised between 50% and 55%.

The first relative minimum MIN_1_activated has a transmission of 10% or less for the first transmission spectrum 300 in the activated state of the photochromic filter compound 15.

The following table shows the measured transmission value in percentage according to the example of FIG. 5.

| Wavelength (nm) | Transmission (%) in deactivated state of the photochromic compound | Transmission (%) in activated state of the photochromic compound |
| --- | --- | --- |
| 780 | 91.4313 | 90.9206 |
| 779 | 91.4838 | 90.9013 |
| 778 | 91.5273 | 90.9075 |
| 777 | 91.5726 | 90.9188 |
| 776 | 91.6125 | 90.9184 |
| 775 | 91.6396 | 90.9254 |
| 774 | 91.6845 | 90.9188 |
| 773 | 91.7073 | 90.9299 |
| 772 | 91.7863 | 90.9307 |
| 771 | 91.7782 | 90.9099 |
| 770 | 91.8380 | 90.9199 |
| 769 | 91.8562 | 90.9026 |
| 768 | 91.9214 | 90.8925 |
| 767 | 91.9780 | 90.9051 |
| 766 | 91.9932 | 90.8633 |
| 765 | 92.0012 | 90.8161 |
| 764 | 92.0387 | 90.7987 |
| 763 | 92.0764 | 90.7702 |
| 762 | 92.1295 | 90.7568 |
| 761 | 92.1334 | 90.7069 |
| 760 | 92.1493 | 90.6408 |
| 759 | 92.1647 | 90.5800 |
| 758 | 92.1872 | 90.5285 |
| 757 | 92.1949 | 90.4482 |
| 756 | 92.2271 | 90.3942 |
| 755 | 92.2207 | 90.3143 |
| 754 | 92.2397 | 90.2489 |
| 753 | 92.2672 | 90.1607 |
| 752 | 92.2769 | 90.0666 |
| 751 | 92.2889 | 89.9839 |
| 750 | 92.2836 | 89.8518 |
| 749 | 92.2849 | 89.7382 |
| 748 | 92.3044 | 89.6232 |
| 747 | 92.3143 | 89.4826 |
| 746 | 92.3220 | 89.3766 |
| 745 | 92.3070 | 89.2111 |
| 744 | 92.3407 | 89.0618 |
| 743 | 92.3318 | 88.8893 |
| 742 | 92.3350 | 88.7299 |
| 741 | 92.3546 | 88.5611 |
| 740 | 92.3631 | 88.3620 |
| 739 | 92.3742 | 88.1590 |
| 738 | 92.3726 | 87.9416 |
| 737 | 92.3840 | 87.7414 |
| 736 | 92.4045 | 87.5049 |
| 735 | 92.4153 | 87.2721 |
| 734 | 92.4411 | 87.0218 |
| 733 | 92.4466 | 86.7517 |
| 732 | 92.4503 | 86.4737 |
| 731 | 92.4680 | 86.2026 |
| 730 | 92.4652 | 85.8789 |

-continued

| Wavelength (nm) | Transmission (%) in deactivated state of the photochromic compound | Transmission (%) in activated state of the photochromic compound |
| --- | --- | --- |
| 729 | 92.4949 | 85.5787 |
| 728 | 92.5285 | 85.2472 |
| 727 | 92.5511 | 84.9110 |
| 726 | 92.5753 | 84.5663 |
| 725 | 92.5824 | 84.2078 |
| 724 | 92.6238 | 83.8102 |
| 723 | 92.6421 | 83.4280 |
| 722 | 92.6686 | 83.0141 |
| 721 | 92.6775 | 82.6031 |
| 720 | 92.7151 | 82.1693 |
| 719 | 92.7520 | 81.7435 |
| 718 | 92.7593 | 81.2551 |
| 717 | 92.7934 | 80.7708 |
| 716 | 92.8190 | 80.2771 |
| 715 | 92.8430 | 79.7604 |
| 714 | 92.8714 | 79.2367 |
| 713 | 92.8842 | 78.7094 |
| 712 | 92.8939 | 78.1523 |
| 711 | 92.9236 | 77.5706 |
| 710 | 92.9601 | 76.9892 |
| 709 | 92.9774 | 76.3968 |
| 708 | 93.0015 | 75.7849 |
| 707 | 92.9848 | 75.1385 |
| 706 | 92.9861 | 74.5143 |
| 705 | 93.0186 | 73.8710 |
| 704 | 93.0344 | 73.2194 |
| 703 | 93.0212 | 72.5242 |
| 702 | 93.0211 | 71.8252 |
| 701 | 93.0181 | 71.1190 |
| 700 | 93.0256 | 70.4387 |
| 699 | 93.0099 | 69.6994 |
| 698 | 93.0036 | 68.9771 |
| 697 | 92.9978 | 68.2721 |
| 696 | 92.9934 | 67.5322 |
| 695 | 92.9721 | 66.7989 |
| 694 | 92.9751 | 66.0562 |
| 693 | 92.9367 | 65.3004 |
| 692 | 92.9292 | 64.5601 |
| 691 | 92.8947 | 63.8213 |
| 690 | 92.9062 | 63.0699 |
| 689 | 92.8492 | 62.3159 |
| 688 | 92.8477 | 61.5738 |
| 687 | 92.8137 | 60.8423 |
| 686 | 92.8093 | 60.1098 |
| 685 | 92.7810 | 59.3970 |
| 684 | 92.7801 | 58.6574 |
| 683 | 92.7770 | 57.9471 |
| 682 | 92.7498 | 57.2350 |
| 681 | 92.7321 | 56.5336 |
| 680 | 92.7205 | 55.8440 |
| 679 | 92.6999 | 55.1548 |
| 678 | 92.6869 | 54.4783 |
| 677 | 92.6972 | 53.8266 |
| 676 | 92.6979 | 53.1597 |
| 675 | 92.6732 | 52.5157 |
| 674 | 92.6774 | 51.8741 |
| 673 | 92.6684 | 51.2307 |
| 672 | 92.6696 | 50.6259 |
| 671 | 92.6734 | 50.0062 |
| 670 | 92.6827 | 49.4363 |
| 669 | 92.6782 | 48.8000 |
| 668 | 92.6807 | 48.2031 |
| 667 | 92.6749 | 47.6324 |
| 666 | 92.6889 | 47.0592 |
| 665 | 92.6924 | 46.4976 |
| 664 | 92.6640 | 45.9355 |
| 663 | 92.6705 | 45.3621 |
| 662 | 92.6611 | 44.8123 |
| 661 | 92.6760 | 44.2729 |
| 660 | 92.6674 | 43.7209 |
| 659 | 92.6575 | 43.1639 |
| 658 | 92.6717 | 42.6413 |
| 657 | 92.9087 | 41.9595 |

-continued

-continued

| Wavelength (nm) | Transmission (%) in deactivated state of the photochromic compound | Transmission (%) in activated state of the photochromic compound | | Wavelength (nm) | Transmission (%) in deactivated state of the photochromic compound | Transmission (%) in activated state of the photochromic compound |
|---|---|---|---|---|---|---|
| 656 | 92.5316 | 41.6730 | | 583 | 34.1767 | 8.1146 |
| 655 | 92.3300 | 41.0190 | | 582 | 35.7545 | 8.4866 |
| 654 | 92.6086 | 40.5212 | | 581 | 37.9094 | 9.0068 |
| 653 | 92.5457 | 39.9907 | 10 | 580 | 40.8887 | 9.7178 |
| 652 | 92.5312 | 39.4763 | | 579 | 44.4402 | 10.5709 |
| 651 | 92.4711 | 38.9346 | | 578 | 48.0371 | 11.4376 |
| 650 | 92.4592 | 38.4168 | | 577 | 51.6919 | 12.3194 |
| 649 | 92.4069 | 37.8869 | | 576 | 55.5658 | 13.2526 |
| 648 | 92.3922 | 37.3941 | | 575 | 59.2339 | 14.1590 |
| 647 | 92.3901 | 36.8667 | 15 | 574 | 62.3506 | 14.9389 |
| 646 | 92.3303 | 36.3583 | | 573 | 65.2862 | 15.6942 |
| 645 | 92.2889 | 35.8514 | | 572 | 67.8413 | 16.3743 |
| 644 | 92.2655 | 35.3327 | | 571 | 69.8569 | 16.9332 |
| 643 | 92.2184 | 34.8120 | | 570 | 71.5557 | 17.4214 |
| 642 | 92.2014 | 34.2960 | | 569 | 72.9375 | 17.8546 |
| 641 | 92.1291 | 33.7692 | 20 | 568 | 74.0188 | 18.2380 |
| 640 | 92.1061 | 33.2909 | | 567 | 74.8402 | 18.5527 |
| 639 | 92.0659 | 32.7847 | | 566 | 75.5045 | 18.8422 |
| 638 | 92.0008 | 32.2925 | | 565 | 75.9864 | 19.1094 |
| 637 | 91.9779 | 31.7989 | | 564 | 76.4150 | 19.3589 |
| 636 | 91.9209 | 31.3290 | | 563 | 76.7492 | 19.6118 |
| 635 | 91.8840 | 30.8382 | 25 | 562 | 77.0765 | 19.8488 |
| 634 | 91.8507 | 30.3694 | | 561 | 77.4536 | 20.1247 |
| 633 | 91.8031 | 29.9202 | | 560 | 77.7911 | 20.3963 |
| 632 | 91.7571 | 29.4795 | | 559 | 78.1655 | 20.7050 |
| 631 | 91.7008 | 29.0411 | | 558 | 78.5431 | 20.9924 |
| 630 | 91.6609 | 28.6100 | | 557 | 78.9217 | 21.3194 |
| 629 | 91.6173 | 28.1978 | | 556 | 79.3014 | 21.6495 |
| 628 | 91.5701 | 27.7870 | 30 | 555 | 79.6486 | 21.9620 |
| 627 | 91.5002 | 27.3851 | | 554 | 79.9941 | 22.3092 |
| 626 | 91.4242 | 27.0085 | | 553 | 80.2734 | 22.6452 |
| 625 | 91.3468 | 26.6183 | | 552 | 80.5840 | 22.9797 |
| 624 | 91.2710 | 26.2528 | | 551 | 80.8486 | 23.3180 |
| 623 | 91.2035 | 25.8957 | | 550 | 81.0445 | 23.6602 |
| 622 | 91.1019 | 25.5736 | 35 | 549 | 81.2172 | 24.0014 |
| 621 | 91.0009 | 25.2666 | | 548 | 81.3213 | 24.3182 |
| 620 | 90.8412 | 24.9734 | | 547 | 81.3558 | 24.6198 |
| 619 | 90.7727 | 24.7056 | | 546 | 81.3354 | 24.9055 |
| 618 | 90.6632 | 24.4629 | | 545 | 81.2663 | 25.2087 |
| 617 | 90.5040 | 24.1952 | | 544 | 81.1037 | 25.4590 |
| 616 | 90.3075 | 23.9248 | 40 | 543 | 80.8763 | 25.7012 |
| 615 | 90.0458 | 23.6454 | | 542 | 80.5657 | 25.9224 |
| 614 | 89.7823 | 23.3749 | | 541 | 80.1686 | 26.1348 |
| 613 | 89.4575 | 23.1186 | | 540 | 79.7648 | 26.3304 |
| 612 | 89.1171 | 22.8543 | | 539 | 79.3345 | 26.5181 |
| 611 | 88.7208 | 22.5937 | | 538 | 78.9563 | 26.7265 |
| 610 | 88.2775 | 22.3287 | 45 | 537 | 78.6640 | 26.9701 |
| 609 | 87.7583 | 22.0602 | | 536 | 78.5320 | 27.2694 |
| 608 | 87.1653 | 21.7793 | | 535 | 78.5884 | 27.6660 |
| 607 | 86.4617 | 21.4895 | | 534 | 78.9888 | 28.1506 |
| 606 | 85.6662 | 21.1796 | | 533 | 79.6393 | 28.7528 |
| 605 | 84.7246 | 20.8436 | | 532 | 80.5504 | 29.4552 |
| 604 | 83.6442 | 20.4753 | 50 | 531 | 81.5779 | 30.2345 |
| 603 | 82.3869 | 20.0796 | | 530 | 82.6665 | 31.0140 |
| 602 | 80.8861 | 19.6367 | | 529 | 83.6940 | 31.8242 |
| 601 | 79.1940 | 19.1343 | | 528 | 84.5748 | 32.5816 |
| 600 | 77.2106 | 18.5945 | | 527 | 85.3124 | 33.3345 |
| 599 | 74.9807 | 17.9809 | | 526 | 85.9459 | 34.0074 |
| 598 | 72.3525 | 17.2943 | | 525 | 86.4669 | 34.6965 |
| 597 | 69.3299 | 16.5251 | 55 | 524 | 86.8679 | 35.3657 |
| 596 | 65.9362 | 15.6811 | | 523 | 87.1826 | 35.9646 |
| 595 | 62.3183 | 14.7802 | | 522 | 87.4997 | 36.6144 |
| 594 | 58.2695 | 13.7792 | | 521 | 87.7137 | 37.2246 |
| 593 | 54.3282 | 12.8223 | | 520 | 87.8433 | 37.8632 |
| 592 | 50.1163 | 11.8191 | | 519 | 87.9862 | 38.4314 |
| 591 | 45.9461 | 10.8298 | 60 | 518 | 88.0737 | 39.0554 |
| 590 | 42.2236 | 9.9555 | | 517 | 88.1671 | 39.5912 |
| 589 | 38.8857 | 9.1808 | | 516 | 88.2307 | 40.1704 |
| 588 | 36.2438 | 8.5593 | | 515 | 88.2375 | 40.7583 |
| 587 | 34.3529 | 8.1215 | | 514 | 88.2787 | 41.3223 |
| 586 | 33.1339 | 7.8496 | | 513 | 88.3414 | 41.8807 |
| 585 | 32.7270 | 7.7524 | 65 | 512 | 88.3765 | 42.4551 |
| 584 | 33.0848 | 7.8496 | | 511 | 88.4583 | 43.0374 |

-continued

| Wavelength (nm) | Transmission (%) in deactivated state of the photochromic compound | Transmission (%) in activated state of the photochromic compound |
|---|---|---|
| 510 | 88.5312 | 43.5857 |
| 509 | 88.6074 | 44.1788 |
| 508 | 88.6703 | 44.7199 |
| 507 | 88.7612 | 45.2760 |
| 506 | 88.8015 | 45.8263 |
| 505 | 88.9066 | 46.3477 |
| 504 | 89.0400 | 46.8934 |
| 503 | 89.1265 | 47.4077 |
| 502 | 89.2050 | 47.8877 |
| 501 | 89.2779 | 48.4164 |
| 500 | 89.3355 | 48.8754 |
| 499 | 89.3877 | 49.3139 |
| 498 | 89.4501 | 49.7691 |
| 497 | 89.5034 | 50.2155 |
| 496 | 89.5456 | 50.5950 |
| 495 | 89.5811 | 50.9432 |
| 494 | 89.5641 | 51.2481 |
| 493 | 89.5449 | 51.5222 |
| 492 | 89.5188 | 51.7499 |
| 491 | 89.4306 | 51.8868 |
| 490 | 89.3964 | 52.0066 |
| 489 | 89.3388 | 52.0984 |
| 488 | 89.2183 | 52.0538 |
| 487 | 89.2546 | 52.0583 |
| 486 | 89.3499 | 52.1294 |
| 485 | 89.1374 | 51.8152 |
| 484 | 89.1129 | 51.5239 |
| 483 | 89.0487 | 51.1990 |
| 482 | 89.0566 | 50.8956 |
| 481 | 89.0446 | 50.4323 |
| 480 | 88.9876 | 49.9138 |
| 479 | 89.0070 | 49.3291 |
| 478 | 88.9217 | 48.6618 |
| 477 | 88.8927 | 47.9208 |
| 476 | 88.7421 | 47.0990 |
| 475 | 88.6748 | 46.2232 |
| 474 | 88.5550 | 45.2412 |
| 473 | 88.3540 | 44.2365 |
| 472 | 88.1667 | 43.1202 |
| 471 | 87.9284 | 41.9684 |
| 470 | 87.7395 | 40.7748 |
| 469 | 87.5315 | 39.5720 |
| 468 | 87.2876 | 38.3667 |
| 467 | 87.1191 | 37.1950 |
| 466 | 86.9471 | 36.0270 |
| 465 | 86.7379 | 34.8691 |
| 464 | 86.6079 | 33.7560 |
| 463 | 86.4396 | 32.6425 |
| 462 | 86.3580 | 31.6047 |
| 461 | 86.2458 | 30.7093 |
| 460 | 86.1706 | 29.8518 |
| 459 | 86.0959 | 29.0712 |
| 458 | 85.9573 | 28.3455 |
| 457 | 85.8451 | 27.7406 |
| 456 | 85.6862 | 27.1852 |
| 455 | 85.5167 | 26.7265 |
| 454 | 85.2997 | 26.3172 |
| 453 | 85.0787 | 26.0095 |
| 452 | 84.8028 | 25.7689 |
| 451 | 84.5660 | 25.5724 |
| 450 | 84.2907 | 25.4444 |
| 449 | 84.0081 | 25.3325 |
| 448 | 83.7169 | 25.3019 |
| 447 | 83.4952 | 25.3111 |
| 446 | 83.2594 | 25.3230 |
| 445 | 83.0496 | 25.3307 |
| 444 | 82.8412 | 25.3746 |
| 443 | 82.6432 | 25.3902 |
| 442 | 82.4779 | 25.4219 |
| 441 | 82.2656 | 25.4296 |
| 440 | 81.9864 | 25.3851 |
| 439 | 81.7159 | 25.3356 |
| 438 | 81.3490 | 25.2247 |

-continued

| Wavelength (nm) | Transmission (%) in deactivated state of the photochromic compound | Transmission (%) in activated state of the photochromic compound |
|---|---|---|
| 437 | 80.9495 | 25.0841 |
| 436 | 80.4058 | 24.8900 |
| 435 | 79.7596 | 24.6727 |
| 434 | 79.1248 | 24.4407 |
| 433 | 78.2116 | 24.1477 |
| 432 | 77.1528 | 23.8135 |
| 431 | 76.0977 | 23.5058 |
| 430 | 74.8772 | 23.1925 |
| 429 | 73.3260 | 22.7995 |
| 428 | 71.5724 | 22.4213 |
| 427 | 69.6632 | 22.0426 |
| 426 | 67.4488 | 21.6180 |
| 425 | 65.0092 | 21.1829 |
| 424 | 62.3063 | 20.7093 |
| 423 | 59.2768 | 20.1890 |
| 422 | 56.0711 | 19.6168 |
| 421 | 52.7426 | 18.9876 |
| 420 | 49.0600 | 18.2670 |
| 419 | 45.4108 | 17.4718 |
| 418 | 41.8468 | 16.6650 |
| 417 | 38.3624 | 15.8413 |
| 416 | 35.1459 | 14.9695 |
| 415 | 32.1784 | 14.1188 |
| 414 | 29.5440 | 13.3114 |
| 413 | 27.2643 | 12.4999 |
| 412 | 25.3271 | 11.7929 |
| 411 | 23.6159 | 11.0248 |
| 410 | 22.3129 | 10.4443 |
| 409 | 21.1980 | 9.8271 |
| 408 | 20.2949 | 9.2650 |
| 407 | 19.5045 | 8.7264 |
| 406 | 18.8203 | 8.1668 |
| 405 | 18.1700 | 7.6799 |
| 404 | 17.4737 | 7.1353 |
| 403 | 16.7188 | 6.6108 |
| 402 | 15.8503 | 6.0747 |
| 401 | 14.8769 | 5.5197 |
| 400 | 13.7095 | 4.9274 |
| 399 | 12.4380 | 4.3877 |
| 398 | 11.1203 | 3.8696 |
| 397 | 9.6662 | 3.2788 |
| 396 | 8.2775 | 2.8268 |
| 395 | 6.9193 | 2.3127 |
| 394 | 5.6970 | 1.9683 |
| 393 | 4.6261 | 1.5667 |
| 392 | 3.6982 | 1.2671 |
| 391 | 2.9306 | 0.9724 |
| 390 | 2.2866 | 0.7560 |
| 389 | 1.8618 | 0.6048 |
| 388 | 1.4542 | 0.4312 |
| 387 | 1.1559 | 0.3234 |
| 386 | 0.9538 | 0.2534 |
| 385 | 0.7804 | 0.1825 |
| 384 | 0.6363 | 0.1177 |
| 383 | 0.5380 | 0.0749 |
| 382 | 0.4312 | 0.0130 |
| 381 | 0.4891 | 0.0522 |
| 380 | 0.5199 | 0.2579 |

One therefore understands that the ophthalmic article as described above allows to wearer a good comfort and protection as well when he is exposed or not to sunlight and enhancing the contrast perception. Protection in the activated state of the photochromic compound 15 allows to decrease significantly bad blue components around 430-435 nm while leaving good blue components (460-530 nm) for circadian rhythm of the wearer.

The ophthalmic article 1 increases in the activated state the retinal exposure to a selected range of wavelengths within the blue-green range. The selected range of wavelengths is the best synchronizer of human non-visual biological functions.

By optimizing retinal light reception in the active state in between 460 nm and 500 nm, the direct stimulation of ipRGC by melanopsin photoreception peaking at 480 nm for humans is induced.

By taking into account the poor spatial density of ipRGC (only 1 to 3% of retinal ganglion cells) compared to that of rod photoreceptors, the probability of absorbing a photon is more than 1 million times lower of a given area of photostimulation. Thus, even if ipRGC phototransduction cascade is highly amplified, ipRGCs seem to receive additional input from a complementary photoreception process involving rods. ipRGCs may be responsive to lower levels of illumination than initially planned, confirming the role of rods. By extending the transmitted spectral range to 460-530 nm, both the direct stimulation of ipRGC and the indirect stimulation by the incoming rod driven signals peaking near 500 nm is induced.

In particular, this specific illumination range in the activated state (spectrum 100) is the most potent stimulus for entraining endogenous rhythms to the daily light cycle with the two photoreceptive processes involved: the melanopsin-driven phototransduction mechanism within the ipRGC itself, peaking near 480 nm and indirect photoreception in rods, peaking near 500 nm.

Therefore, optical devices according to embodiments of the invention may be used in therapy and/or disease prevention.

In particular, ophthalmic articles 1 according to embodiments of the invention may be used in therapy for treatment of subjects suffering from chronobiological disorders such as circadian rhythm sleep disorders (jet lag delayed and advanced sleep phase syndromes), hormonal troubles, cognition and memory disorders, psychomotor disorders, body temperature deregulation, mood disorders, alertness disorders, neurobehavioral troubles. Indeed, the ophthalmic article 1 according to the invention can compensate inadequate lighting conditions (lack of beneficial blue) to help the biological clock to remain synchronized through the good blue/melatonin secretion relationship.

The present invention provides also a method to treat circadian rhythm sleep disorders comprising selectively allowing retinal exposure of an eye to at least one selected range of wavelengths of light in the visible spectrum of 460 nm to 560 nm, preferably of 480 nm to 520 nm.

Additionally or alternatively, optical devices according to embodiments of the invention may be used in therapy to treat seasonal affective disorder (SAD).

Symptoms of this disorder can include fatigue, depression, and changes in appetite and sleep patterns.

The present invention provides also a method to treat seasonal affective disorders comprising selectively allowing retinal exposure of an eye to at least one selected range of wavelengths of light in the visible spectrum of 460 nm to 560 nm, preferably of 480 nm to 520 nm.

The ophthalmic article 1 according to the invention has another beneficial effect on the visual system.

As already indicated, prior art optical devices with solar protection result in an increase of the pupil size.

Advantageously, the retinal exposure to the selected range of wavelengths of light of 460 nm to 530 nm, preferably of 480 nm to 520 nm induces maximal pupil constriction by stimulation of ipRGC.

As a consequence of this pupil constriction, the amount of harmful blue-violet light impinged on the retina decreases as a function of the decrease of the pupil diameter (compared to prior art sunglasses), thus limiting retina exposure to noxious wavelengths. This might be particularly advantageously used for children sunglasses and/or workers who work outside at least a part of the day.

Advantageously, the ophthalmic article 1 according to the invention provides enhanced protection of the eye against harmful wavelengths (UV and/or blue-violet harmful light) while allowing retinal exposure to beneficial blue-green light.

The ophthalmic article 1 of the invention may be configured to enhance the constriction of the pupil of the eye.

In an example, an ophthalmic article 1 according to any embodiment of the invention may be used in controlling and enhancing the pupil constriction wherein the selected range of wavelengths of light is centered on a wavelength of substantially 480 nm.

Pupil constriction is wavelength-dependent and is maximal for a light excitation centered at substantially 480 nm, the melanopsin absorption peak.

The present invention provides also a method to control the constriction of the pupil of an eye comprising selectively allowing retinal exposure of an eye to at least one selected range of wavelengths of light in the visible spectrum of 460 nm to 530 nm, preferably of 480 nm to 520 nm.

The invention further provides a method for selecting an ophthalmic article 1 according to the invention adapted for a wearer.

The method comprises the steps of measuring the effect of different optical devices according to the invention on the diameter of the pupil of the wearer and of selecting the ophthalmic article 1 for which the wearer's pupil diameter is optimized in function of the luminance to have a compromise between visual acuity and chronobiology.

An optical lens with an active system may be used to optimize the wearer's pupil diameter in a large range of situations whether exposed or not to sunlight.

In an exemplary embodiment, the method selects the ophthalmic article 1 for which the wearer's pupil diameter is minimal when wearing the optical device.

Advantageously, the method according to the invention allows providing the ophthalmic article 1 that ensures the greatest protection against harmful wavelengths, i.e. UV and/or blue-violet light.

Furthermore, advantageously, an ophthalmic article 1 according to any embodiment of the invention may be used to improve visual acuity of the wearer wearing sunglasses. The decrease in pupil size which accompanies the ophthalmic article 1 should reduce to some extent the deleterious effects on visual acuity of the optical aberrations and stray light.

Therefore, the ophthalmic article 1 according to the invention enhances the protection against harmful light while preserving the beneficial effects of blue-green part of the sunlight, in particular limiting pupil dilation, maintaining good visual acuity and ensuring the daily blue light intake to maintain good synchronization of biological, When not exposed, the deactivated state of the photochromic compound ensures high transmission values, in particular a luminous transmission Tv of more than 70%. The wearer does therefore not need to change his sunglasses for example.

In case of driving a car, this is also very important for security, in particular when entering or leaving a tunnel and rapid changing light conditions.

The invention claimed is:

1. An ophthalmic article comprising at least one substrate and a photochromic filter compound, the ophthalmic article having a first transmission spectrum in an activated state of the photochromic filter compound and a second transmission spectrum in a deactivated state of the photochromic filter compound, wherein:

the first and the second transmission spectra at wavelengths lower than 380 nm is lower than 1%;

the first and the second transmission spectra have a relative first maximum (MAX_1_activated, MAX 1_deactivated) between 460 nm and 510 nm;

the first and the second transmission spectrum have a relative first minimum (MIN_1_activated, MIN_1_deactivated) between 560 nm and 610 nm; and $$\frac{T_v^{deactivated}}{T_v^{activated}} > 2.5$$

wherein the first relative maximum (MAX_1_activated) of the first transmission spectrum in the activated state of the photochromic filter compound presents a transmission comprised between 40% and 55%; and wherein:

$$T_v^{activated}$$

is the luminous transmittance according to ISO_13666 between 380 nm and 780 nm in the activated state of the photochromic filter compound; and $$T_v^{deactivated}$$

is the luminous transmittance according to ISO_13666 between 380 nm and 780 nm in the deactivated state of the photochromic filter compound.

2. The ophthalmic article according to claim 1, wherein:

$$3.1 > \frac{T_v^{deactivated}}{T_v^{activated}} > 2.6.$$

3. The ophthalmic article according to claim 1, wherein the luminous transmittance $$T_v^{activated}$$

according to ISO_13666 is lower than 30% in the activated state of the photochromic filter compound and the luminous transmittance $$T_v^{deactivated}$$

according to ISO_13666 is higher than 65% in the deactivated state of the photochromic filter compound.

4. The ophthalmic article according to claim 1, wherein in the activated state of the photochromic filter compound, the transmission of the first spectrum is less than 30%, between 425 nm and 450 nm.

5. The ophthalmic article according to claim 1, wherein in the activated state of the photochromic filter compound, the transmission of the first spectrum shows a variation of less than 2% between 430 nm and 450 nm.

6. The ophthalmic article according to claim 1, wherein said first maxima (MAX_1_activated, MAX_1_deactivated) of the first and the second spectra are distant less than 5 nm from each other and said first minima (MIN_1_activated, MIN_1_deactivated) of the first and the second spectrum and are distant less than 5 nm from each other.

7. The ophthalmic article according to claim 1, wherein $$\frac{T_{MAX1}^{deactivated}}{T_{MAX1}^{activated}} > 1.5$$

wherein:

$$T_{MAX1}^{activated}$$

is the transmittance at the wavelength of the first maximum (MAX_1_activated) in the activated state of the photochromic filter compound; and $$T_{MAX1}^{deactivated}$$

is the transmittance at the wavelength of the first maximum (MAX_1_deactivated) in the deactivated state of the photochromic filter compound.

8. The ophthalmic article according to claim 1, wherein $$\frac{T_{MIN1}^{deactivated}}{T_{MIN1}^{activated}} > 3.5$$

wherein:

$$T_{MIN1}^{activated}$$

is the transmittance at the wavelength of the first minimum (MIN_1_activated) in the activated state of the photochromic filter compound; and $$T_{MIN1}^{deactivated}$$

is the transmittance at the wavelength of the first minimum (MIN_1_deactivated) in the deactivated state of the photochromic filter compound.

9. The ophthalmic article according to claim 1, wherein the transmission between 435 nm and 530 nm is equal or higher than 70%, for the second transmission spectrum in the deactivated state of the photochromic filter compound.

10. The ophthalmic article according to claim 1, wherein the first relative minimum (MIN_1_deactivated) has a transmission of 35%, or less for the second transmission spectrum in the deactivated state of the photochromic filter compound.

11. The ophthalmic article according to claim 1, wherein the transmission at a wavelength equal or superior to 610 nm is equal or higher than 75%, for the second transmission spectrum in the deactivated state of the photochromic filter compound.

12. The ophthalmic article according to claim 1, wherein the second transmission spectrum in the deactivated state of the photochromic filter compound presents a second relative minimum (MIN_2_deactivated) at 536 nm+/−3 nm with a transmission comprised between 65% and 80%.

13. The ophthalmic article according to claim 1, wherein the second transmission spectrum in the deactivated state of the photochromic filter compound presents a second relative maximum (MAX_2_deactivated) at 547 nm+/−3 nm with a transmission comprised between 70% and 85%.

14. The ophthalmic article according to claim 1, further comprising a film deposited on the substrate and comprising the photochromic filter compound.

15. The ophthalmic article according to claim 1, wherein the photochromic filter compound is integrated in the matrix of the substrate.

16. The ophthalmic article according to claim 1, wherein the photochromic filter compound comprises a mix of solvent dyes, narrow band dyes and photochromic dyes.

17. The ophthalmic article according to claim 1, wherein the at least one substrate comprises one or more colorants and/or pigments, said colorants and/or pigments of all the substrates interacting together with the photochromic filter compound in order to absorb the light passing through the ophthalmic article for providing the first transmission spectrum in the activated state of the photochromic filter compound and the second transmission spectrum in the deactivated state of the photochromic filter compound.

18. The ophthalmic article according to claim 1, wherein the first relative minimum (MIN_1_activated) has a transmission of 10% or less for the first transmission spectrum in the activated state of the photochromic filter compound.

19. Sunglasses comprising an ophthalmic article according to claim 1.

* * * * *